(12) United States Patent
Soroushian et al.

(10) Patent No.: US 10,452,715 B2
(45) Date of Patent: Oct. 22, 2019

(54) SYSTEMS AND METHODS FOR COMPRESSING GEOTAGGED VIDEO

(75) Inventors: Kourosh Soroushian, San Diego, CA (US); Jason Braness, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 816 days.

(21) Appl. No.: 13/539,337

(22) Filed: Jun. 30, 2012

(65) Prior Publication Data

US 2014/0003501 A1 Jan. 2, 2014

(51) Int. Cl.
*G06F 16/787* (2019.01)
*G06F 16/783* (2019.01)
(Continued)

(52) U.S. Cl.
CPC .......... *G06F 16/787* (2019.01); *G06F 16/70* (2019.01); *G06F 16/73* (2019.01); *G06F 16/739* (2019.01); *G06F 16/75* (2019.01); *G06F 16/783* (2019.01); *H04N 19/597* (2014.11); *H04N 19/70* (2014.11); *H04N 19/40* (2014.11); *H04N 21/23109* (2013.01); *H04N 21/422* (2013.01); *H04N 21/8456* (2013.01); *H04N 21/85406* (2013.01)

(58) Field of Classification Search
None
See application file for complete search history.

(56) References Cited

U.S. PATENT DOCUMENTS 4,009,331 A 2/1977 Goldmark et al.
4,694,357 A 9/1987 Rahman et al.
(Continued)

FOREIGN PATENT DOCUMENTS

AU 2010202963 A1 2/2012
CN 1221284 A 6/1999
(Continued)

OTHER PUBLICATIONS

Kim, Seon Ho, Sakire Arslan Ay, and Roger Zimmerman, "Design and implementation of geo-tagged video search framework", Journal of Visual Communication and Image Representation, 21 (2010) 773-786.*

Ding, Li-Fu, Pei-Kuei Tsung, Shao-Yi Chien, Wei-Yin Chen, and Liang-Gee Chen, "Content-Aware Prediction Algorithm With Inter-View Mode Decision for Multiview Video Coding", IEEE Transactions on Multimedia, vol. 10, No. 8, Dec. 2008.*

(Continued)

*Primary Examiner* — Michael J Hess
(74) *Attorney, Agent, or Firm* — KPPB LLP

(57) ABSTRACT

Systems and methods for compressing and sharing geotagged video in accordance with embodiments of the invention are disclosed. One embodiment includes receiving a captured video sequence, where at least one geographic location is associated with the captured video sequence, selecting a segment of the captured video sequence, identifying a set of relevant video segments from a geotagged video database based on the at least one geotag associated with the captured video sequence, determining the video segment from the set of relevant video segments that is the best match by comparing the similarity of the content in the video segments to the content of the selected segment from the captured video sequence, encoding the selected segment, where the selected segment is encoded using predictions that include references to the video segment that is the best match, and storing the encoded video segment in the geotagged video database.

23 Claims, 14 Drawing Sheets

(51) Int. Cl.

| | | |
|---|---|---|
| *G06F 16/73* | (2019.01) | |
| *H04N 19/597* | (2014.01) | |
| *H04N 19/70* | (2014.01) | |
| *G06F 16/75* | (2019.01) | |
| *G06F 16/70* | (2019.01) | |
| *G06F 16/738* | (2019.01) | |
| *H04N 19/40* | (2014.01) | |
| *H04N 21/231* | (2011.01) | |
| *H04N 21/422* | (2011.01) | |
| *H04N 21/845* | (2011.01) | |
| *H04N 21/854* | (2011.01) | |

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,903,261 A | 5/1999 | Walsh et al. |
| 5,907,597 A | 5/1999 | Mark |
| 5,956,729 A | 9/1999 | Goetz et al. |
| 5,959,690 A | 9/1999 | Toebes, VIII et al. |
| 6,031,622 A | 2/2000 | Ristow et al. |
| 6,046,778 A | 4/2000 | Nonomura et al. |
| 6,065,050 A | 5/2000 | DeMoney |
| 6,079,566 A | 6/2000 | Eleftheriadis et al. |
| 6,169,242 B1 | 1/2001 | Fay et al. |
| 6,195,388 B1 | 2/2001 | Choi et al. |
| 6,204,883 B1 | 3/2001 | Tsukagoshi |
| 6,246,803 B1 | 6/2001 | Gauch et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,395,969 B1 | 5/2002 | Fuhrer |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel et al. |
| 6,807,306 B1 | 10/2004 | Girgensohn et al. |
| 6,819,394 B1 | 11/2004 | Nomura et al. |
| 6,856,997 B2 | 2/2005 | Lee et al. |
| 6,859,496 B1 | 2/2005 | Boroczky et al. |
| 6,917,652 B2 | 7/2005 | Lyu |
| 6,944,621 B1 | 9/2005 | Collart |
| 6,944,629 B1 | 9/2005 | Shioi et al. |
| 6,956,901 B2 | 10/2005 | Boroczky et al. |
| 6,985,588 B1 | 1/2006 | Glick et al. |
| 6,988,144 B1 | 1/2006 | Luken et al. |
| 7,127,155 B2 | 10/2006 | Ando et al. |
| 7,209,892 B1 | 4/2007 | Galuten et al. |
| 7,237,061 B1 | 6/2007 | Boic |
| 7,242,772 B1 | 7/2007 | Tehranchi |
| 7,330,875 B1 | 2/2008 | Parasnis et al. |
| 7,340,528 B2 | 3/2008 | Noblecourt et al. |
| 7,356,245 B2 | 4/2008 | Belknap et al. |
| 7,366,788 B2 | 4/2008 | Jones et al. |
| 7,457,359 B2 | 11/2008 | Mabey et al. |
| 7,478,325 B2 | 1/2009 | Foehr |
| 7,493,018 B2 | 2/2009 | Kim |
| 7,499,938 B2 | 3/2009 | Collart |
| 7,728,878 B2 | 6/2010 | Yea et al. |
| 7,869,691 B2 | 1/2011 | Kelly et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,289,338 B2 | 10/2012 | Priyadarshi et al. |
| 8,311,115 B2 | 11/2012 | Gu et al. |
| 8,321,556 B1 | 11/2012 | Chatterjee et al. |
| 8,386,621 B2 | 2/2013 | Park |
| 8,456,380 B2 | 6/2013 | Pagan |
| 8,472,792 B2 | 6/2013 | Butt et al. |
| RE45,052 E | 7/2014 | Li |
| 8,768,984 B2 * | 7/2014 | Priddle et al. ............... 707/827 |
| 8,832,297 B2 | 9/2014 | Soroushian et al. |
| 8,914,534 B2 | 12/2014 | Braness et al. |
| 9,021,119 B2 | 4/2015 | Schaar et al. |
| 9,025,659 B2 | 5/2015 | Soroushian et al. |
| 9,197,944 B2 | 11/2015 | Reisner |
| 9,350,990 B2 | 5/2016 | Orton-Jay et al. |
| 9,357,210 B2 | 5/2016 | Orton-Jay et al. |
| 9,571,827 B2 | 2/2017 | Su et al. |
| 9,661,049 B2 | 5/2017 | Gordon |
| 9,712,890 B2 | 7/2017 | Shivadas et al. |
| 10,148,989 B2 | 12/2018 | Amidei et al. |
| 2001/0030710 A1 | 10/2001 | Werner |
| 2002/0034252 A1 | 3/2002 | Owen et al. |
| 2002/0051494 A1 | 5/2002 | Yamaguchi et al. |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0094031 A1 | 7/2002 | Ngai et al. |
| 2002/0110193 A1 | 8/2002 | Yoo et al. |
| 2002/0118953 A1 | 8/2002 | Kim |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay |
| 2002/0180929 A1 | 12/2002 | Tseng et al. |
| 2002/0184159 A1 | 12/2002 | Tadayon et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0035488 A1 | 2/2003 | Barrau |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0165328 A1 | 9/2003 | Grecia |
| 2003/0185302 A1 | 10/2003 | Abrams |
| 2003/0185542 A1 | 10/2003 | McVeigh et al. |

(56) References Cited

U.S. PATENT DOCUMENTS

| | | |
|---|---|---|
| 2003/0206558 A1 | 11/2003 | Parkkinen et al. |
| 2003/0216922 A1 | 11/2003 | Gonzales et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0006701 A1 | 1/2004 | Kresina |
| 2004/0021684 A1 | 2/2004 | Millner |
| 2004/0025180 A1 | 2/2004 | Begeja et al. |
| 2004/0047614 A1 | 3/2004 | Green |
| 2004/0052501 A1 | 3/2004 | Tam |
| 2004/0071453 A1 | 4/2004 | Valderas |
| 2004/0081434 A1 | 4/2004 | Jung et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0217971 A1 | 11/2004 | Kim |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0180641 A1 | 8/2005 | Clark |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1 | 9/2005 | van Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0072672 A1* | 4/2006 | Holcomb et al. ........ 375/240.25 |
| 2006/0078301 A1 | 4/2006 | Ikeda et al. |
| 2006/0093320 A1 | 5/2006 | Hallberg et al. |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0177812 A1 | 8/2007 | Yang et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0192818 A1 | 8/2008 | DiPietro et al. |
| 2008/0256105 A1 | 10/2008 | Nogawa et al. |
| 2008/0263354 A1 | 10/2008 | Beuque et al. |
| 2008/0279535 A1 | 11/2008 | Hague et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0146055 A1* | 6/2010 | Hannuksela .................. 709/206 |
| 2010/0158109 A1 | 6/2010 | Dahlby et al. |
| 2010/0189183 A1 | 7/2010 | Gu et al. |
| 2010/0226582 A1* | 9/2010 | Luo ................... G06F 17/30265 382/224 |
| 2010/0228795 A1 | 9/2010 | Hahn |
| 2010/0259690 A1 | 10/2010 | Wang et al. |
| 2011/0055585 A1 | 3/2011 | Lee |
| 2011/0080940 A1 | 4/2011 | Bocharov |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0239078 A1 | 9/2011 | Luby et al. |
| 2011/0246659 A1 | 10/2011 | Bouazizi |
| 2011/0268178 A1 | 11/2011 | Park et al. |
| 2011/0302319 A1 | 12/2011 | Ha et al. |
| 2011/0305273 A1 | 12/2011 | He et al. |
| 2011/0310982 A1 | 12/2011 | Yang et al. |
| 2011/0314176 A1 | 12/2011 | Frojdh et al. |
| 2011/0314500 A1 | 12/2011 | Gordon |
| 2012/0023251 A1 | 1/2012 | Pyle et al. |
| 2012/0072493 A1* | 3/2012 | Muriello ................ G06Q 50/01 709/204 |
| 2012/0093214 A1 | 4/2012 | Urbach |
| 2012/0105279 A1 | 5/2012 | Brown et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0203766 A1* | 8/2012 | Hornkvist ......... G06F 17/30112 707/722 |
| 2012/0269275 A1* | 10/2012 | Hannuksela ....... H04N 13/0048 375/240.25 |
| 2012/0278496 A1 | 11/2012 | Hsu |
| 2012/0307883 A1 | 12/2012 | Graves |
| 2012/0316941 A1* | 12/2012 | Moshfeghi ............. G06Q 30/02 705/14.16 |
| 2013/0007200 A1 | 1/2013 | van der Schaar et al. |
| 2013/0019257 A1* | 1/2013 | Tschernutter .. H04N 21/234309 725/4 |
| 2013/0044821 A1 | 2/2013 | Braness et al. |
| 2013/0046902 A1 | 2/2013 | Villegas Nuñez et al. |
| 2013/0054958 A1 | 2/2013 | Braness et al. |
| 2013/0055084 A1 | 2/2013 | Soroushian et al. |
| 2013/0058393 A1 | 3/2013 | Soroushian |
| 2013/0061045 A1 | 3/2013 | Kiefer et al. |
| 2013/0095855 A1* | 4/2013 | Bort ........................... 455/456.2 |
| 2013/0097172 A1* | 4/2013 | McIntosh ............ G06F 17/3002 707/741 |
| 2013/0191754 A1* | 7/2013 | Rose .................. H04N 1/00198 715/732 |
| 2013/0196292 A1 | 8/2013 | Brennen et al. |
| 2013/0279810 A1* | 10/2013 | Li ..................... G06K 9/00724 382/195 |
| 2014/0003523 A1 | 1/2014 | Soroushian et al. |
| 2014/0211840 A1 | 7/2014 | Butt et al. |
| 2014/0241421 A1 | 8/2014 | Orton-Jay et al. |
| 2014/0250473 A1 | 9/2014 | Braness et al. |
| 2014/0359680 A1 | 12/2014 | Shivadas et al. |
| 2015/0104153 A1 | 4/2015 | Braness et al. |
| 2015/0229695 A1 | 8/2015 | Kim et al. |

(56) References Cited

U.S. PATENT DOCUMENTS

| | | | |
|---|---|---|---|
| 2016/0127440 A1 | 5/2016 | Gordon | |
| 2016/0134881 A1 | 5/2016 | Wang et al. | |
| 2017/0366833 A1 | 12/2017 | Amidei et al. | |

FOREIGN PATENT DOCUMENTS

| | | |
|---|---|---|
| CN | 1723696 | 1/2006 |
| EP | 757484 A2 | 2/1997 |
| EP | 813167 A2 | 12/1997 |
| EP | 1420580 A1 | 5/2004 |
| EP | 1718074 A1 | 11/2006 |
| EP | 2661895 A2 | 11/2013 |
| JP | 08163488 | 6/1996 |
| JP | 08287613 A | 11/1996 |
| JP | 11328929 A | 11/1999 |
| JP | 02001043668 A | 2/2001 |
| JP | 2002170363 A | 6/2002 |
| JP | 2002218384 A | 8/2002 |
| JP | 2003250113 A | 9/2003 |
| JP | 2005027153 | 1/2005 |
| KR | 100221423 | 9/1999 |
| KR | 100221423 B1 | 9/1999 |
| KR | 2002013664 | 2/2002 |
| KR | 20020064888 A | 8/2002 |
| WO | 1995015660 A1 | 6/1995 |
| WO | 2001031497 A1 | 5/2001 |
| WO | 2001050732 A2 | 7/2001 |
| WO | 2002001880 A1 | 1/2002 |
| WO | 2004054247 A1 | 6/2004 |
| WO | 2004097811 A1 | 11/2004 |
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2012094171 A1 | 7/2012 |
| WO | 2012094181 A2 | 7/2012 |
| WO | 2012094189 A1 | 7/2012 |
| WO | 2017218095 A1 | 12/2017 |

OTHER PUBLICATIONS

Karouia, Ines, Ezzeddine Zagrouba, and Walid Barhoumi, "Video Similarity Measurement Based on Attributed Relational Graph Matching", N.T. Nguyen, R. Katarzyniak (Eds.): New Challenges in Applied Intelligence Technologies, SCI 134, pp. 173-182, 2008.*
Jeannin, Sylvie et al., "Video Motion Representation for Improved Content Access", IEEE Transactions on Consumer Electronics, vol. 46, No. 3., Aug. 2004, 11 Pages.
Multiview Video Coding (MVC), ISO/IEC 14496-10, 2008 Amendment.
Lewis, "H.264/MPEG-4 AVC CABAC overview", http://www.theonlineoasis.co.uk/notes.html, Dec. 3, 2012.
"What is a DVD?" printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?" printed Aug. 22, 2009 from http://www.doom9.org/dvd-structure.htm, 5 pgs.
U.S. Appl. No. 13/224,298, "Final Office Action Received", dated May 19, 2014, 27 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Blasiak, "Video Transrating and Transcoding: Overview of Video Transrating and Transcoding Technologies", Ingenient Technologies, TI Developer Conference, Aug. 6-8, 2002, 22 pgs.

Casares et al., "Simplifying Video Editing Using Metadata", DIS2002, 2002, pp. 157-166.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Fielding et al., "Hypertext Transfer Protocol—HTTP1.1", Network Working Group, RFC 2616, Jun. 1999, 114 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", W-Fi Planet, printed May 4, 2007 from http://www.wi-fiplanet.com/news/article.php/3093141, Oct. 16, 2003, 3 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", from http://www.iodata.com/catalogs/AVLP2DVDLA_Flyer200505.pdf, 1 page.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Long et al., "Silver: Simplifying Video Editing with Metadata", CHI 2003: New Horizons, Apr. 5-10, 2003, pp. 628-629.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Noboru, "Play Fast and Fine Video on Web! codec", Co.9 No. 12, Dec. 1, 2003, 2 pgs.
Noe, A. "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, pp. 1-51.
Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pgs.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne et al., "Real Time Streaming Protocol (RTSP)", Internet Engineering Task Force, RFC 2326, Apr. 1998, 80 pgs.
Siglin, "HTTP Streaming: What You Need to Know", streamingmedia.com, 2010, 15 pgs.

(56) References Cited

OTHER PUBLICATIONS

Siglin, "Unifying Global Video Strategies, MP4 File Fragmentation for Broadcast, Mobile and Web Delivery", Nov. 16, 2011, 16 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 page.
Unknown, "AVI RIFF File Reference (Direct X 8.1 C++ Archive)", printed from http://msdn.microsoft.com/archive/en- us/dx81_c/directx_cpp/htm/avirifffilereference.asp?fr . . . on Mar. 6, 2006, 7 pgs.
Unknown, "Entropy and Source Coding (Compression)", TCOM 570, 1999-9, pp. 1-22.
Unknown, "MPEG-4 Video Encoder: Based on International Standard ISO/IEC 14496-2", Patni Computer Systems, Ltd., publication date unknown, 15 pgs.
Zambelli, "IIS Smooth Streaming Technical Overview", Microsoft Corporation, Mar. 2009.
Broadq—The Ultimate Home Entertainment Software, printed May 11, 2009 from ittp://web.srchive.org/web/20030401122010/www.broadq.com/qcasttuner/, 1 pg.
European Search Report for Application 11855103.5, search completed Jun. 26, 2014, 10 pgs.
European Search Report for Application 11855237.1, search completed Jun. 12, 2014, 9 pgs.
European Supplementary Search Report for Application EP09759600, completed Jan. 25, 2011, 11 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 97 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application No. PCT/US2008/083816, dated May 18, 2010, 6 pgs.
International Preliminary Report on Patentability for International Application PCT/US2011/067167, dated Feb. 25, 2014, 8 pgs.
International Search Report for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2017/031114, Search completed Jun. 29, 2017, dated Jul. 19, 2017, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
LINKSYSÂ®: "Enjoy your digital music and pictures on your home entertainment center, without stringing wires!", Model No. WMA 11B, printed May 9, 2007 from http://linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 23 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft WindowsÂ® XP Media Center Edition 2005, Frequently asked Questions, printed May 4, 2007 from http://www.microsoft.com/windowsxp/mediacenter/evaluation/faq.mspx, 6 pgs.
Microsoft WindowsÂ® XP Media Center Edition 2005: Features, printed May 9, 2007, from http://www.microsoft.com/windowsxp/mediacenter/evaluation/features.mspx, 4 pgs.
Open DML AVI-M-JPEG File Format Subcommittee, "Open DML AVI File Format Extensions", Version 1.02, Feb. 28, 1996, 29 pgs.
Pc world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 page.
Supplementary European Search Report for Application No. Ep 04813918, Search Completed Dec. 19, 2012, 3 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Written Opinion for International Application No. PCT/US2004/041667, Filing Date Dec. 8, 2004, Report Completed May 24, 2007, dated Jun. 20, 2007, 4 pgs.
Written Opinion for International Application No. PCT/US2008/083816, Opinion completed Jan. 10, 2009, dated Jan. 22, 2009, 5 pgs.
Written Opinion for International Application No. PCT/US2009/046588, completed Jul. 14, 2009, dated Jul. 23, 2009, 5 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"DVD—MPeg differences", printed Jul. 2, 2009 from http://dvd.sourceforge.net/dvdinfo/dvdmpeg.html, 1 page.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Innovation of technology arrived", I-O Data, Nov. 2004, Retrieved from http://www.iodata.com/catalogs/AVLP2DVDLA_Flyer200505.pdf on May 30, 2013, I-O Data, 1 page.
"KISS Players, KISS DP-500", retrieved from http://www.kiss-technology.com/?p=dp500 on May 4, 2007, 1 page.
"MPEG ISO/IEC 13818-1", Information Technology—Generic Coding Of Moving Pictures And Associated Audio: Systems, Apr. 27, 1995, 151 pgs.
"MPEG-4, Part 14, ISO/IEC 14496-14", Information technology—Coding of audio-visual objects, Nov. 15, 2003, 18 pgs.
"Netflix turns on subtitles for PC, Mac streaming", Yahoo! News, Apr. 21, 2010, Printed on Mar. 26, 2014, 3 pgs.

(56) References Cited

OTHER PUBLICATIONS

"OpenDML AVI File Format Extensions", Version 1.02, OpenDML AVI M-JPEG File Format Subcommittee, retrieved from www.the-labs.com/Video/odmlff2-avidef.pdf, Last revision: Feb. 28, 1996. Reformatting: Sep. 1997.

"QCast Tuner for PS2", printed May 11, 2009 from http://web.archive.org/web/20030210120605/www.divx.com/software/detail.php?ie=39, 2 pgs.

"Smooth Streaming Client", The Official Microsoft IIS Site, Sep. 24, 2010, 4 pgs.

"Supported Media Formats", Supported Media Formats, Android Developers, Printed on Nov. 27, 2013 from developerandroid.com/guide/appendix/media-formats.html, 3 pgs.

"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.

"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.

"Thread: SSME (Smooth Streaming Medial Element) config.xml review (Smooth Streaming Client configuration file)", Printed on Mar. 26, 2014, 3 pgs.

"Transcoding Best Practices", From movideo, Printed on Nov. 27, 2013 from code.movideo.com/Transcoding_Best_Practices, 5 pgs.

"Using Http Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.

"Video Manager and Video Title Set IFO file headers", printed Aug. 22, 2009 from http://dvd.sourceforge.net/dvdinfo/ifo.htm, 6 pgs.

\* cited by examiner

SYSTEMS AND METHODS FOR COMPRESSING GEOTAGGED VIDEO

FIELD OF THE INVENTION

The present invention relates to video encoding and more specifically to compression of geotagged video.

BACKGROUND

The term multiview video coding is used to describe processes that encode video captured by multiple cameras from different viewpoints. The basic approach of most multiview coding schemes is to exploit not only the redundancies that exist temporally between the frames within a given view, but also the similarities between frames of neighboring views. By doing so, a reduction in bit rate relative to independent coding of the views can be achieved without sacrificing the reconstructed video quality. The primary usage scenario for multiview video is to support 3D video applications, where 3D depth perception of a visual scene is provided by a 3D display system. There are many types of 3D display system including classic stereo systems that require special-purpose glasses to more sophisticated multiview auto-stereoscopic displays that do not utilize glasses. The stereo systems utilize two views, where a left-eye view is presented to the viewer's left eye, and a right-eye view is presented to the viewer's left eye.

Another application of multiview video is to enable free-viewpoint video. In this scenario, the viewpoint and view direction can be interactively changed. Each output view can either be one of the input views or a virtual view that was generated from a smaller set of multiview inputs and other data that assists in the view generation process. With such a system, viewers can freely navigate through the different viewpoints of the scene.

Multiview video contains a large amount of inter-view statistical dependencies, since all cameras capture the same scene from different viewpoints. Therefore, combined temporal and inter-view predictions can be utilized to more efficiently encode multiview video. Stated another way, a frame from a certain camera can be predicted not only from temporally related frames from video captured by the same camera, but also from frames of video captured at the same time by neighboring cameras. A sample prediction structure is shown in FIG. 1. Frames are not only predicted from temporal references, but also from inter-view references. The prediction is adaptive, so the best predictor among temporal and inter-view references can be selected on a block basis in terms of rate-distortion cost, or a combination of both temporal and inter-view reference can be used for different portions of the video frame.

Multiview Video Coding (MVC, ISO/IEC 14496-10:2008 Amendment 1) is an extension of the H.264/MPEG-4 Advanced Video Coding (AVC) standard that provides efficient coding of multiview video. The basic H.264/MPEG-4 AVC standard covers a Video Coding Layer (VCL) and a Network Abstraction Layer (NAL). While the VCL creates a coded representation of the source content, the NAL formats these data and provides header information in a way that enables simple and effective customization of the use of VCL data for a broad variety of systems A coded H.264/MPEG-4 AVC video data stream is organized into NAL units, which are packets that each contain an integer number of bytes. A NAL unit starts with a one-byte indicator of the type of data in the NAL unit. The remaining bytes represent payload data. NAL units are classified into video coding layer (VCL) NAL units, which contain coded data for areas of the frame content (coded slices or slice data partitions), and non-VCL NAL units, which contain associated additional information. The set of consecutive NAL units associated with a single coded frame is referred to as an access unit. A set of consecutive access units with certain properties is referred to as an encoded video sequence. An encoded video sequence (together with the associated parameter sets) represents an independently decodable part of a video bitstream. An encoded video sequence always starts with an instantaneous decoding refresh (IDR) access unit, which signals that the IDR access unit and all access units that follow it in the bitstream can be decoded without decoding any of the frames that preceded it.

The VCL of H.264/MPEG-4 AVC follows the so-called block-based hybrid video coding approach. The way frames are partitioned into smaller coding units involves partitioning frames into slices, which are in turn subdivided into macroblocks. Each slice can be parsed independently of the other slices in the frame. Each frame is partitioned into macroblocks that each covers a rectangular area of 16×16 luma samples and, in the case of video in 4:2:0 chroma sampling format, 8×8 sample areas of each of the two chroma components. The samples of a macroblock are either spatially or temporally predicted, and the resulting prediction residual signal is represented using transform coding. Depending on the degree of freedom for generating the prediction signal H.264/MPEG-4 AVC supports three basic slice coding types that specify the types of coding supported for the macroblocks within the slice. An I slice uses intra-frame coding involving spatial prediction from neighboring regions within a frame. A P slice supports both intra-frame coding and inter-frame predictive coding using one signal for each prediction region (i.e. a P slice references one other frame of video). A B slice supports intra-frame coding, inter-frame predictive coding, and also inter-frame bi-predictive coding using two prediction signals that are combined with a weighted average to form the region prediction (i.e. a B slice references two other frames of video). In referencing different types of predictive coding, both inter-frame predictive coding and inter-frame bi-predictive coding can be considered to be forms of inter-frame prediction.

In H.264/MPEG-4 AVC, the coding and display order of frames is completely decoupled. Furthermore, any frame can be used as reference frame for motion-compensated prediction of subsequent frames, independent of its slice coding types. The behavior of the decoded picture buffer (DPB), which can hold up to 16 frames (depending on the supported conformance point and the decoded frame size), can be adaptively controlled by memory management control operation (MMCO) commands, and the reference frame lists that are used for coding of P or B slices can be arbitrarily constructed from the frames available in the DPB via reference picture list modification (RPLM) commands.

A key aspect of the MVC design extension to the H.264/MPEG-4 AVC standard is that it is mandatory for the compressed multiview stream to include a base view bitstream, which is coded independently from all other views. The video data associated with the base view is encapsulated in NAL units that have previously been defined for the 2D video, while the video associated with the additional views are encapsulated in an extension NAL unit type that is used for both scalable video coding (SVC) and multiview video. A flag is specified to distinguish whether the NAL unit is associated with an SVC or MVC bitstream.

Inter-view prediction is a key feature of the MVC design, and it is enabled in a way that makes use of the flexible reference frame management capabilities that are part of H.264/MPEG-4 AVC, by making the decoded frames from other views available in the reference frame lists from other views for use in inter-frame prediction. Specifically, the reference frame lists are maintained for each frame to be decoded in a given view. Each such list is initialized as usual for single-view video, which would include the temporal reference frames that may be used to predict the current frame. Additionally, inter-view reference frames are included in the list and are thereby also made available for prediction of the current frame.

In MVC, inter-view reference frames are contained within the same access unit as the current frame, where an access unit contains all the NAL units pertaining to a certain capture or display time instant (see for example the access units shown in FIG. 1). The MVC design does not allow the prediction of a frame in one view at a given time using a frame from another view at a different time. This would involve inter-view prediction across different access units.

With respect to the encoding of individual slices and macroblocks, the core macroblock-level and lower-level decoding modules of an MVC decoder are the same, regardless of whether a reference frame is a temporal reference or an inter-view reference. This distinction is managed at a higher level of the decoding process.

To achieve access to a particular frame in a given view, the decoder should first determine an appropriate access point. In H.264/MPEG-4 AVC, each IDR frame provides a clean random access point. In the context of MVC, an IDR frame in a given view prohibits the use of temporal prediction for any of the views on which a particular view depends at that particular instant of time; however, inter-view prediction may be used for encoding the non-base views of an IDR frame. This ability to use inter-view prediction for encoding an IDR frame reduces the bit rate needed to encode the non-base views, while still enabling random access at that temporal location in the bitstream. Additionally, MVC also introduces an additional frame type, referred to as an anchor frame for a view. Anchor frames are similar to IDR frames in that they do not use temporal prediction for the encoding of any view on which a given view depends, although they do allow inter-view prediction from other views within the same access unit (see for example FIG. 1). Moreover, it is prohibited for any frame that follows the anchor frame in both bitstream order and display order to use any frame that precedes the anchor frame in bitstream order as a reference for inter-frame prediction, and for any frame that precedes the anchor frame in decoding order to follow it in display order. This provides a clean random access point for access to a given view.

Many cameras, including cameras in mobile phone handsets, support geotagging of captured still and video images using geographic information captured using a Global Positioning System (GPS) receiver and other sensors such as accelerometers, and magnetometers. Geotagging is the process of adding geographical identification metadata to media. The geotag metadata usually includes latitude and longitude coordinates, though a geotag can also include altitude, bearing, distance, tilt, accuracy data, and place names. Geotags can be associated with a video sequence and/or with individual frames within the video sequence.

SUMMARY OF THE INVENTION

Systems and methods in accordance with embodiments of the invention encode video sequences using reference video segments extracted from different video sequences. In a number of embodiments, the video segments are stored in a geotagged video database and geotags associated with the video sequence enable the identification of video segments that can be utilized in the encoding of the video sequence. One embodiment of the method of the invention includes receiving a captured video sequence at an encoding server, where at least one geotag indicating at least one geographic location is associated with the captured video sequence, selecting a segment of the captured video sequence using the encoding server, identifying a set of relevant video segments from a geotagged video database using the encoding server based on the at least one geotag associated with the captured video sequence and geotags associated with video segments in the geotagged video database, determining the video segment from the set of relevant video segments that is the best match to the selected segment from the captured video sequence using the encoding server by comparing the similarity of the content in the video segments within the set of related video segments to the content of the selected segment from the captured video sequence, encoding the selected segment from the captured video sequence using the encoding server, where the selected segment is encoded using predictions that include references to the video segment from the geotagged video database that is the best match, and storing the encoded video segment in the geotagged video database using the encoding server.

In a further embodiment, the geotags are metadata including at least one piece of information selected from the group consisting of latitude and longitude coordinates, altitude, bearing, distance, velocity, tilt, accuracy data, time of day, date, and place name.

In another embodiment, the at least one geotag associated with the captured video sequence includes latitude and longitude coordinates, altitude, bearing, and tilt.

In a still further embodiment, the at least one geotag associated with the captured video sequence includes a plurality of geotags associated with individual frames in the captured video sequence.

In still another embodiment, receiving a captured video sequence includes receiving a captured video sequence from a video recording device.

In a yet further embodiment, the video recording device is an always on video recording device.

In yet another embodiment, receiving a captured video sequence includes receiving an upload of a captured video sequence.

In a further embodiment again, selecting a segment of the captured video sequence includes selecting an intra-frame from the captured video sequence, the set of relevant video segments from the geotagged video database includes a set of frames selected from the group consisting of intra-frames and anchor frames, and determining the video segment from the set of relevant video segments that is the best match includes comparing the similarity of the selected intra-frame to the frames in the set of frames.

In another embodiment again, the video segments include short sequences of video frames.

In a further additional embodiment, identifying a set of relevant video segments from a geotagged video database using the encoding server based on the at least one geotag associated with the captured video sequence and geotags associated with video segments in the geotagged video database further includes determining a capture location for the selected video segment based on information in the at least one geotag associated with the captured video sequence, and searching the geotagged video database for video segments having geotags indicating proximity to the capture location of the selected video segment.

In a still yet further embodiment, identifying a set of relevant video segments from a geotagged video database using the encoding server based on the at least one geotag associated with the captured video sequence and geotags associated with video segments in the geotagged video database further includes determining the capture altitude, bearing and tilt for the selected video segment based on information in the at least one geotag associated with the captured video sequence, and searching the geotagged video database for video segments having geotags indicating that the video segments capture a similar view of the scene captured from the capture location at the capture altitude, bearing and tilt.

In still yet another embodiment, identifying a set of relevant video segments from a geotagged video database using the encoding server based on the at least one geotag associated with the captured video sequence and geotags associated with video segments in the geotagged video database further includes determining the capture time of the selected video segment based on information in the at least one geotag associated with the captured video sequence, and searching the geotagged video database for video segments having geotags indicating that the video segments were captured at a similar time to the capture time of the selected video segment.

In a still further embodiment again, the geotagged video database includes metadata indicating the video recording device that captured a video segment, a plurality of video segments in the geotagged video database were captured using the same recording device used to capture the received video sequence, and identifying a set of relevant video segments from a geotagged video database using the encoding server based on the at least one geotag associated with the captured video sequence and geotags associated with video segments in the geotagged video database further includes searching for relevant video segments captured by the same recording device used to capture the received video sequence using the metadata in the geotagged video database indicating the video recording devices that captured video segments.

In still another embodiment again, comparing the similarity of the content in the video segments within the set of related video segments to the content of the selected segment from the captured video sequence further includes performing feature matching with respect to at least one frame in the selected video segment and at least one frame from a video segment within the set of related video segments, and comparing the photometric similarity of at least one frame in the selected video segment and the at least one frame from the video segment within the set of related video segments.

In a still further additional embodiment, determining the video segment from the set of relevant video segments that is the best match considers both similarity of content measured during feature matching and photometric similarity.

In still another additional embodiment, determining the video segment from the set of relevant video segments that is the best match considers the number of video segments on which the encoding of a video segment depends.

In a yet further embodiment again, determining the video segment from the set of relevant video segments that is the best match considers the recording device that captured the video segment.

In yet another embodiment, the video segment from the geotagged video database that is the best match is a different resolution to the resolution of the captured video sequence, encoding the selected segment from the captured video sequence using the encoding server further includes resampling the video segment from the getagged video database that is the best match to the resolution of the captured video sequence, and encoding the selected segment using predictions that include references to the video segment from the geotagged video database that is the best match includes encoding the selected segment using predictions that include references to the resampled video segment.

A further additional embodiment again also includes generating metadata describing the resampling process used to resample the video segment from the geotagged video database and storing the metadata in a container file including the encoded segment from the captured video sequence.

In another additional embodiment again, storing the encoded video segment in the geotagged video database further includes storing the encoded video segment in a separate container file using the encoding server.

In a still yet further embodiment again, storing the encoded video segment in the geotagged video database further includes storing the encoded video segment in a container file that includes at least one video segment on which the encoding of the video segment depends.

In still yet another embodiment again, the encoded video sequence is multiplexed into the container file so that all reference frames are located prior to a frame that references them.

In a still yet further additional embodiment, storing the encoded video segment in the geotagged video database includes storing the encoded video segment on a server and writing an entry including the location of the encoded video segment into the geotagged video database.

In still yet another additional embodiment, the captured video sequence is not synchronized with any of the video segments in the geotagged video database.

In a yet further additional embodiment again, the captured video sequence includes a plurality of video sequences that are synchronized, and the plurality of video sequences in the captured video sequence are not synchronized with any of the video segments in the geotagged video database.

In a still yet further additional embodiment again, the captured video sequence and at least one video segment in the geotagged video database are captured using different cameras.

In another further embodiment, the captured video sequence and at least one video segment in the geotagged video database are captured using the same camera.

Another embodiment of the invention includes an encoding server, and a geotagged video database including a plurality of video sequences tagged with geotags indicating geographic locations. In addition, the encoding server is configured to receive a captured video sequence including at least one geotag indicating at least one geographic location, select a segment of the captured video sequence, identify a set of relevant video segments from the geotagged video database using the at least one geotag associated with the captured video sequence, determine the video segment from the set of relevant video segments that is the best match to the selected segment from the captured video sequence based on the content of the video segments in the set of related video segments and the content of the selected segment from the captured video sequence, encode the selected segment from the captured video sequence using predictions that include references to the video segment from the geotagged video database that is the best match, and store the encoded video segment in the geotagged video database.

In a further embodiment, the geotags are metadata including at least one selected from the group consisting of latitude and longitude coordinates, altitude, bearing, distance, velocity, tilt, accuracy data, time of day, date, and place name.

In another embodiment, the at least one geotag associated with the captured video sequence includes latitude and longitude coordinates, altitude, bearing, and tilt.

In a still further embodiment, the at least one geotag associated with the captured video sequence includes a plurality of geotags associated with individual frames in the captured video sequence.

In still another embodiment, the encoding server is configured to receive a captured video sequence from a video recording device.

In a yet further embodiment, the video recording device is an always on video recording device.

In yet another embodiment, the encoding server is configured to receive an upload of a captured video sequence.

In a further embodiment again the set of relevant video segments from the geotagged video database includes a set of frames selected from the group including intra-frames and anchor frames, and the encoding server is configured to select a segment of the captured video sequence by selecting an intra-frame from the captured video sequence, and determine the video segment from the set of relevant video segments that is the best match by comparing the similarity of the selected intra-frame to the frames in the set of frames.

In another embodiment again, the video segments include short sequences of video frames.

In a further additional embodiment, the encoding server being configured to identify a set of relevant video segments from the geotagged video database using the at least one geotag associated with the captured video sequence further includes the encoding server being configured to determine a capture location for the selected video segment based on information in the at least one geotag associated with the captured video sequence, and search the geotagged video database for video segments having geotags indicating proximity to the capture location of the selected video segment.

In a still yet further embodiment, the encoding server being configured to identify a set of relevant video segments from the geotagged video database using the at least one geotag associated with the captured video sequence further includes the encoding server being configured to determine the capture altitude, bearing and tilt for the selected video segment based on information in the at least one geotag associated with the captured video sequence, and search the geotagged video database for video segments having geotags indicating that the video segments capture a similar view of the scene captured from the capture location at the capture altitude, bearing and tilt.

In still yet another embodiment, the encoding server being configured to identify a set of relevant video segments from the geotagged video database using the at least one geotag associated with the captured video sequence further includes the encoding server being configured to determine the capture time of the selected video segment based on information in the at least one geotag associated with the captured video sequence using the encoding server, and search the geotagged video database for video segments having geotags indicating that the video segments were captured at a similar time to the capture time of the selected video segment.

In a still further embodiment again, the geotagged video database includes metadata indicating the video recording device that captured a video segment, a plurality of video segments in the geotagged video database were captured using the same recording device used to capture the received video sequence, and the encoding server being configured to identify a set of relevant video segments from the geotagged video database using the at least one geotag associated with the captured video sequence further includes the encoding server being configured to search the geotagged video database for relevant video segments that were captured by the same recording device used to capture the received video sequence.

In still another embodiment again, the encoding server being configured to determine the video segment from the set of relevant video segments that is the best match to the selected segment from the captured video sequence based on the content of the video segments in the set of related video segments and the content of the selected segment from the captured video sequence further includes the encoding server being configured to perform feature matching with respect to at least one frame in the selected video segment and at least one frame from a video segment within the set of related video segments, and compare the photometric similarity of at least one frame in the selected video segment and the at least one frame from the video segment within the set of related video segments.

In a still further additional embodiment, the encoding server is configured to identify the video segment from the set of relevant video segments that is the best match by considering both similarity of content measured during feature matching and photometric similarity.

In still another additional embodiment, the encoding server is configured to identify the video segment from the set of relevant video segments that is the best match by considering the number of video segments on which the encoding of a video segment depends.

In a yet further embodiment again, the encoding server is configured to identify the video segment from the set of relevant video segments that is the best match by considering the video recording device that captured the video segment.

In yet another embodiment again, the encoding server being configured to store the encoded video segment in the geotagged video database further includes storing the encoded video segment in a separate container file using the encoding server.

In a yet further additional embodiment, the encoding server being configured to store the encoded video segment in the geotagged video database further includes storing the encoded video segment in a container file that includes at least one video segment on which the encoding of the video segment depends.

In yet another additional embodiment, the encoding server is configured to multiplex the encoded video sequence into the container file so that all reference frames are located prior to a frame that references them.

In a further additional embodiment again, the encoding server being configured to store the encoded video segment in the geotagged video database further includes configuring the encoding server to store the encoded video segment on a server and writing an entry including the location of the encoded video segment into the geotagged video database.

In another additional embodiment again, the captured video sequence is not synchronized with any of the video segments in the geotagged video database.

In a still yet further embodiment again, the captured video sequence includes a plurality of video sequences that are synchronized, and the plurality of video sequences in the captured video sequence are not synchronized with any of the video segments in the geotagged video database.

In still yet another embodiment again, the captured video sequence and at least one video segment in the geotagged video database are captured using different cameras.

In a still yet further embodiment again, the captured video sequence and at least one video segment in the geotagged video database are captured using the same camera.

In another further embodiment, the video segment from the geotagged video database that is the best match is a different resolution to the resolution of the captured video sequence and the encoding server being configured to encode the selected segment from the captured video sequence using inter-view predictions that include references to the video segment from the geotagged video database that is the best match further includes the encoding server being configured to resample the video segment from the getagged video database that is the best match to the resolution of the captured video sequence and encode the selected segment using predictions that include references to the resampled video segment.

Yet another further embodiment includes a machine readable medium containing processor instructions, where execution of the instructions by a processor causes the processor to perform a process that includes receiving a captured video sequence including at least one geotag indicating at least one geographic location, selecting a segment of the captured video sequence, obtain a set of relevant video segments from a geotagged video database using the at least one geotag associated with the captured video sequence, determining the video segment from the set of relevant video segments that is the best match to the selected segment from the captured video sequence based on the content of the video segments in the set of related video segments and the content of the selected segment from the captured video sequence, and encoding the selected segment from the captured video sequence using predictions that include references to the video segment from the geotagged video database that is the best match.

DETAILED DESCRIPTION

Figure 1:
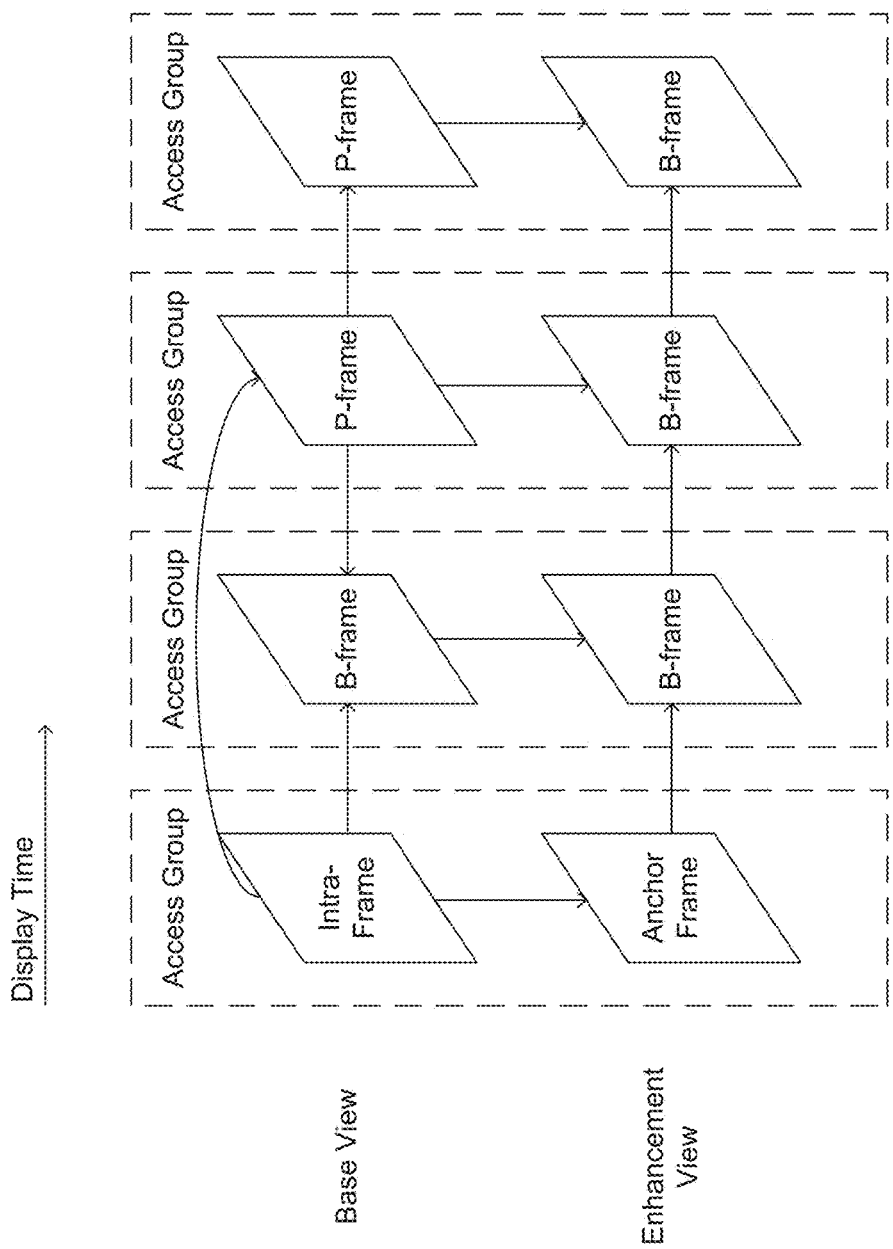
FIG. 1 conceptually illustrates video encoded in accordance with the MVC extension of the H.264/MPEG-4 AVC video standard.

Turning now to the drawings, systems and methods for sharing geotagged video in accordance with embodiments of the invention are illustrated. As the amount of video stored in the video sharing system increases, the likelihood that new video added to the video sharing system contains a view of a scene that is similar to a view of the scene captured in another video recording also increases. In several embodiments, video is captured by "always on" video recording devices. Due to the daily routines of the users of these video recording devices and the similarity of certain portions of the daily routines of different users, the likelihood of similarity in the scenes captured by such video recording devices is also high. When the captured video sequences are geotagged, the geotag(s) of a newly captured video sequence can be utilized to identify segments of video within a geotagged video database (i.e. a database of geotagged video) that contain views of the scenes in the newly captured video sequence. Accordingly, video sharing systems in accordance with embodiments of the invention can compress the overall size of a geotagged video database by encoding video sequences using prediction based on segments of video stored within the geotagged video database.

The predictions are performed in a manner similar to any inter-frame predictive or bi-predictive inter-frame coding, however, the constraints imposed in multiview encoding associated with the assumption that the views are captured at the same time are relaxed to account for the video segments being captured by unsynchronized cameras and/or at different times. In discussing systems and methods in accordance with embodiments of the invention, predictions that include references to a reference frame can be considered as including (but not being limited to) inter-frame predictions and bi-predictive inter-frame coding using the reference frame and another frame (typically in the sequence being encoded). In many embodiments, a captured video sequence may include two or more video sequences that are synchronized (e.g. video captured in stereo 3D). Therefore, some of the video in the geotagged video database may be synchronized with one or more video sequences in the database. Relaxing the constraints imposed by multiview encoding, however, enables further compression by exploiting redundancy with video sequences that are not synchronized with one or more captured video sequences.

In many embodiments, a captured video sequence is divided into segments and the segments are encoded using prediction based upon segments of video contained within the geotagged video database that contains similar views of the scenes recorded in one or more segments of the captured video sequence. In a number of embodiments, the geotagged video database includes a large number of different video sequences and a set of geotagged video segments from the different video sequences that contain similar views of a scene can be initially identified using a geotag associated with the segment of the captured video. The extent to which geotags indicate a match depends on the information contained within the geotag. Latitude and longitude information within a geotag can indicate that a video segment is relevant (i.e. that a video segment was captured close by and/or is likely to record a similar view of a scene). Information concerning altitude, bearing and tilt can increase the confidence that a video segment contains a similar view of a scene. Information concerning the time of capture can also indicate the extent to which the scene itself is likely to have changed.

Based on an initial set of video segments identified using geotags, the video segment that is the best match to the segment of the captured video sequence can be identified based upon the content of the segments. In several embodiments, feature matching is utilized to determine the similarity of the content of video segments. In certain embodiments, a comparison of the photometric similarity of the video segments is performed when determining the video segment that is the best match. The captured video segment can then be encoded using prediction based on the segment of video from the geotagged video database that is the closest match.

In a number of embodiments, the video segments from a captured video sequence that are encoded using prediction based upon references frames from other video segments are single intra-frames. In this way, compression is achieved by simply matching single frames between the captured video sequence and frames within the geotagged video database. In other embodiments, the reference video segments include multiple frames and are encoded using prediction based upon closely matching segments of video from the geotagged video database. When a video sequence is captured at a high velocity (i.e. the video recording device is in motion) or low frame rate, significant compression gains can be obtained by using prediction based on reference frames from video segments captured at lower velocities and/or higher frame rates to encode segments of the captured video sequence. At high velocity or low frame rate, prediction between frames in the captured video sequence may be inaccurate leading to inefficiency in the video encoding process. Accordingly, the velocity at which a scene is captured and the frame rate at which the scene is captured can have similar impacts on encoding efficiency and can be collectively referred to as the rate of the video. A high rate corresponds to a low velocity and/or high frame rate. A low rate corresponds to a high velocity and/or low frame rate. Where a geotagged video database contains a similar video sequence captured at a higher rate, predictions based upon frames from a video segment captured at a higher rate can be used to improve the efficiency of the encoding of the captured video sequence by providing better predictions than are possible using inter-frame prediction alone. In several embodiments, a geotag including velocity information associated with a frame that is being encoded can be utilized to apply a filter such as (but not limited to) a filter that applies blur simulating motion blur to increase the similarity of a frame in a reference segment. In this way, additional compression gains can be obtained through application of the filter. In several embodiments, the blurring may take place individually on each frame, or alternatively by applying transformations on a combination of two or more frames. In a number of embodiments, a similar effect can be achieved using bi-predictive filtering utilizing the preceding frame in the captured video segment and the reference frame selected from the reference video segment. In other embodiments, any of a variety of filters can be applied to the references of a reference segment to increase similarity to a frame of a captured video segment.

When video is requested from a video sharing website in accordance with an embodiment of the invention, a video sequence that is encoded using predictions that include references to other video segments can be delivered to the playback device including a video decoding system along with the referenced video segments. Alternatively, the video sharing system can transcode the video sequence into a conventional video bitstream (i.e. a bitstream that does not include predictions based on reference frames from other video segments) to reduce the bandwidth utilized when transmitting the requested video sequence.

Due to the ability to perform encoding using predictions that reference frames that themselves rely upon predictions from reference frames in other video segments, the amount of data provided to a playback device or the complexity of the transcoding process used when providing data to a playback device is directly related to the number of video segments on which the predictions used in the encoding of the requested video sequence depend. In several embodiments, the video sharing system limits the number of dependencies allowed when encoding a video sequence. In a number of embodiments, the video sharing system transcodes video segments stored in the geotagged video database to conventional video bitstreams in order to reduce the number of dependencies when encoding a video sequence. In many embodiments, the transcoding of a video segment into a conventional video bitstream prompts the reencoding of other video segments within the geotagged video database.

Systems and methods for sharing geotagged video and for encoding video sequences using predictions that reference frames in video segments stored within a geotagged video database to reduce the overall size of the geotagged video database in accordance with embodiments of the invention are discussed further below.

Video Sharing Systems

Figure 2:
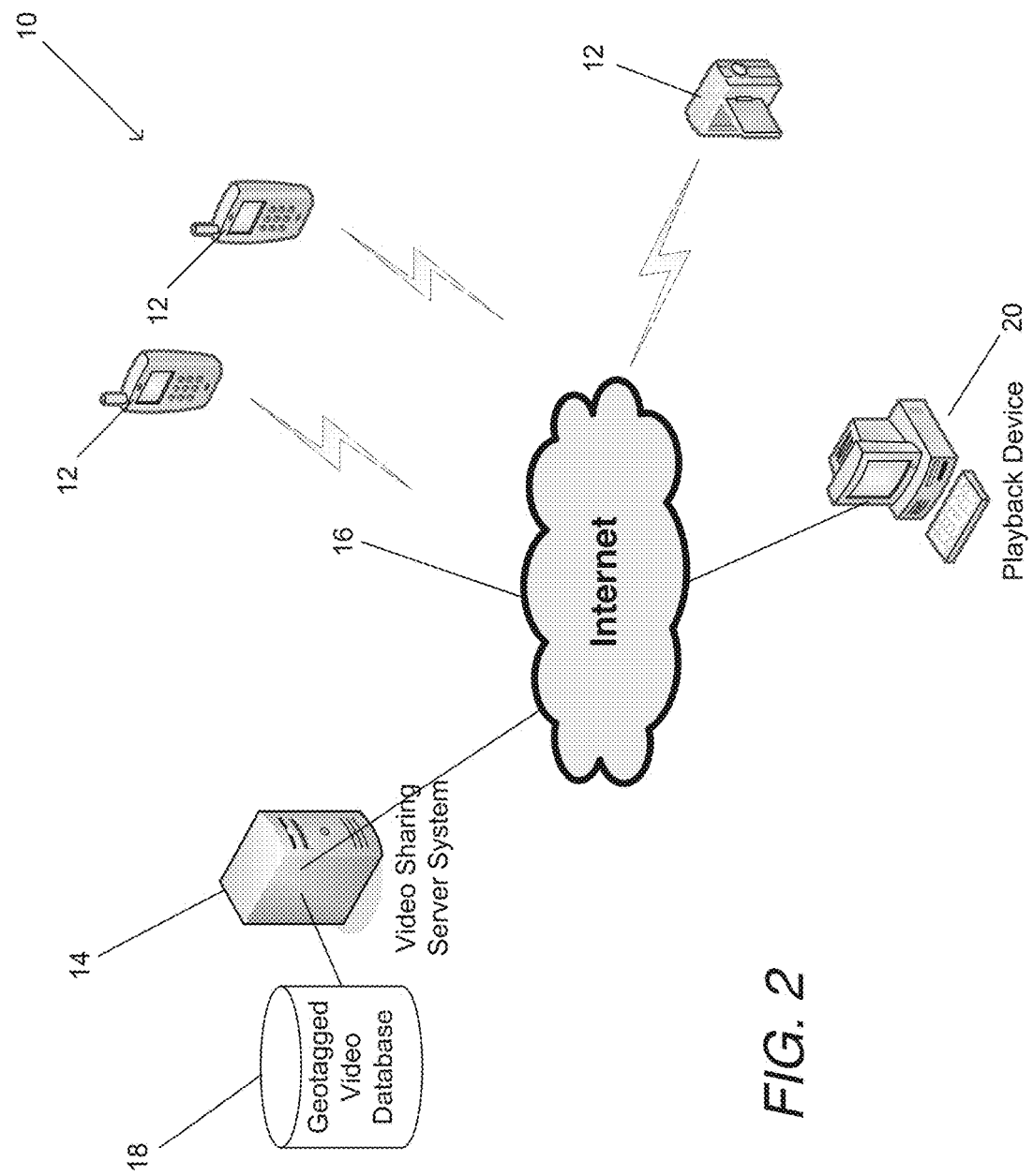
FIG. 2 conceptually illustrates a video sharing system in accordance with an embodiment of the invention.

A video sharing system in accordance with an embodiment of the invention is illustrated in FIG. 2. In the illustrated embodiment, a variety of video recording devices 12 capture and geotag video sequences, which are then streamed and/or uploaded to a video sharing server system 14 via the Internet 16. In many embodiments, the video recording devices 12 are "always on" video recording devices that are worn by users and continuously capture video from the viewpoint of the user. The video recording devices can also be conventional video recording devices that either directly stream video to the video sharing server system 14 or capture video that is uploaded to the video sharing server system 14.

The video sharing server system 14 stores the video captured by the video recording devices 12 in a geotagged video database 18. As part of the process of storing the video captured by the video recording devices 12, the video sharing server system 14 can attempt to reduce the size of the captured video sequences by reencoding frames of the captured video sequences using predictions based on video segments contained within the geotagged video database 18. As the amount of video stored within the geotagged video database increases, the likelihood that newly captured video sequences contain segments of video that are similar to segments of video contained within the geotagged video database also increases. The likelihood that a geotagged video database contains similar video segments to a captured video sequence increases considerably where an "always on" video recording device captures the video sequence. Due to the fact that "always on" video recording devices typically capture video from the viewpoint of a user, similarity within a user's daily routine and between users' daily routines results in "always on" video recording devices capturing a significant amount of video of the same subject matter from similar viewpoints in an unsynchronized manner and at different times (although different users may capture a similar view in an asynchronous manner at the same time).

A playback device 20 that includes a video decoding system can request video stored in the geotagged video database 18 from the video sharing server system 14. In several embodiments, the video sharing server system 14 provides the playback device 20 with the requested video sequence and the relevant reference frames used in the decoding of the requested video sequence from the geotagged video database 18. In several embodiments, the video server system provides a top level index file and the playback device can use the index file to request the video sequence and the reference files using Hypertext Transfer Protocol (HTTP) or another appropriate stateless (or stateful) data transfer protocol. In many embodiments, the video sharing server system 14 uses the references to relevant reference frames in the requested video sequence to transcode the requested video sequence as a conventional video bitstream (i.e. a sequence of video frames that does not include references to frames in other video segments). The transcoded bitstream is then provided to a playback device. In this way, the bandwidth utilized in providing the requested bitstream is reduced relative to the bandwidth utilized in sending reference frames from the other segments that are the basis of predictions. In a number of embodiments, the video sharing server system multiplexes the encoded video sequence and the relevant frames from the reference segments into a container file that is accessible to playback devices. In other embodiments, any of a variety of techniques can be utilized to provide the encoded video sequence and the reference segments referenced in the encoding the encoded video sequence to a playback device.

In many embodiments, the video sharing server system 14 attempts to compress a captured video sequence by identifying a segment of video in the geotagged video database 18 that can be used in the encoding of a segment of the captured video sequence. In several embodiments, the video sharing server system 14 attempts to compress a captured video sequence by encoding intra-frames of the captured video sequence using predictions based on frames selected from the geotagged video database 18. In this way, the video sharing system obtains the benefits in compression associated with reducing the size of the intra-frames in the captured video sequence and at the same time simplifying the process of locating matching video segments. In other embodiments, the video segments utilized during encoding contain multiple frames.

In a number of embodiments, the video sharing server system 14 can identify potentially similar segments of video and/or frames of video in the geotagged video database 18 using geotags associated with a captured sequence of video by a video recording device 12. From a set of potentially similar frames of video and/or video segments, the video sharing server system 14 can identify the frame of video and/or video segment that is the best match when encoding a captured video sequence based upon factors including (but not limited to) scene similarity and photometric similarity.

Figure 2A:
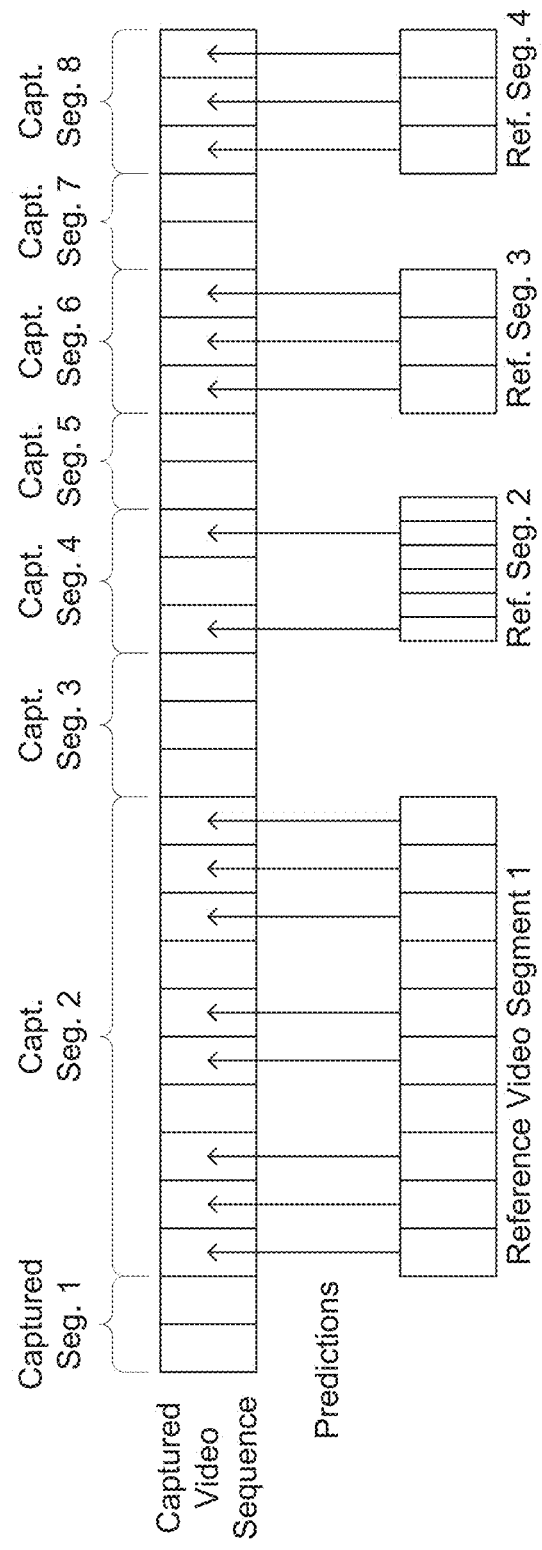
FIG. 2A conceptually illustrates encoding of a video sequence using reference frames from a plurality of reference segments taken from at least one different video sequence in accordance with embodiments of the invention.

The use of a number of reference video segments in the encoding of a captured video sequence in accordance with embodiments of the invention is conceptually illustrated in FIG. 2A. In the illustration, the frames of a captured video sequence are shown. Some of the frames of the captured video sequence can be encoded using predictions from the frames of reference video segments. As can readily be appreciated, not all segments from a captured video sequence will necessarily include content that corresponds to a video segment stored in a geotagged video database. Accordingly, predictions based upon video segments from the geotagged video database are not used in the encoding of Captured Segments 1, 3, 5, and 7. Similar video segments were able to be located in a geotagged video database to enable the encoding of Captured Segments 2, 4, 6, and 8 with Reference Segments 1, 2, 3, and 4 respectively. Different cameras may capture the reference segments, at different times, and from different perspectives. Typically, the reference segments are extracted from various video sequences stored in the geotagged video database. The extraction process can occur at the point of ingest and/or in response to a segment in a video sequence being identified as being a relevant reference segment for use in the encoding of a captured video segment. As can readily be appreciated, not all frames in a video segment are encoded using predictions from frames in a reference segment (see for example Captured Segment 2 and Reference Segment 1). In addition, the captured segment can be encoded using reference frames from a reference segment captured at different frame rates (see for example Captured Segment 4 and Reference Segment 2) or at different resolutions. Processes to identify similar segments in a geotagged video database that can be utilized in the encoding of a captured video sequence and processes for encoding segments within the captured video sequence using the reference segments in accordance with embodiments of the invention are discussed further below.

Although a specific video sharing system is illustrated in FIG. 2, any of a variety of system architectures can be utilized to implement video sharing systems in accordance with embodiments of the invention including systems in which the video sharing server system includes a plurality of servers performing different functions and/or in different geographic locations. In addition, the geotagged video database can include metadata concerning video sequences stored elsewhere on video distribution servers such as (but not limited to) the servers of a content distribution network. Accordingly, video sequences can be understood as being contained within a geotagged video database in circumstances where the video sequences are not stored within the database, but metadata concerning the video sequences (including geotags and the location of the video sequence) is stored within the geotagged video database. Processes for encoding video sequences for storage in a geotagged video database in accordance with embodiments of the invention are discussed further below.

Encoding Captured Video Sequences

A large database of geotagged video sequences is likely to contain video segments that are similar to video segments within a video sequence captured by a video recording device. One or more geotags on a captured video sequence can be utilized to identify video segments within a geotagged video database that can be used as the source of reference frames in the encoding of a captured video sequence.

Figure 3:
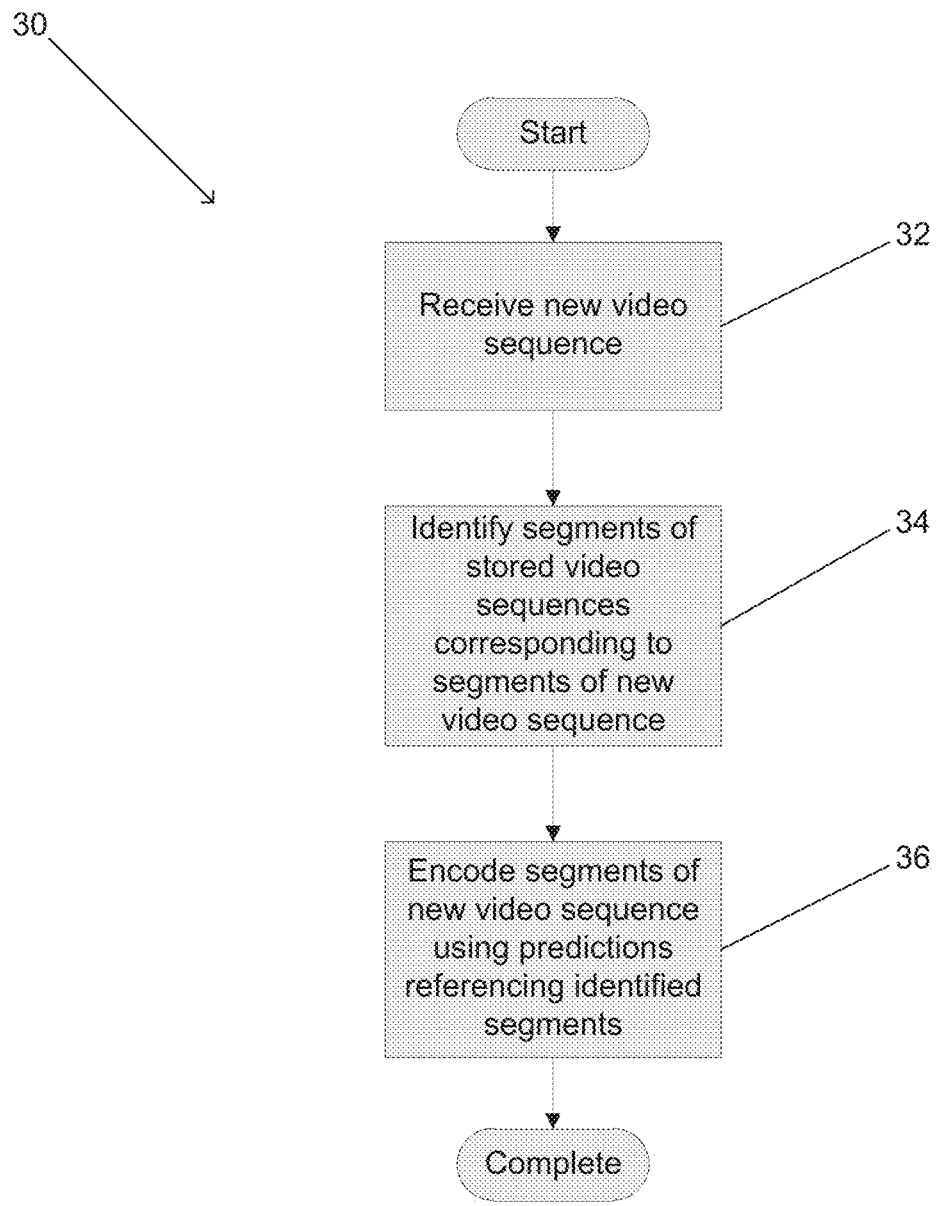
FIG. 3 is a flow chart illustrating a process encoding captured video sequences in accordance using predictions based upon video segments contained within a geotagged video database in accordance with an embodiment of the invention.

A process for encoding a captured video sequence for storage in a geotagged video database in accordance with an embodiment of the invention is illustrated in FIG. 3. The process 30 includes receiving (32) the captured video sequence directly from the video recording device or indirectly via the uploading of the captured video sequence. In many embodiments, one or more video segments are identified in a captured video sequence. A variety of criteria can be utilized in determining the video segments including discrete time intervals, scene changes, and/or the location of intra-frames within the captured video sequence. Segments of video stored within the geotagged video database that contain similar views as segments of the captured video sequence are then identified (34) using geotags and by comparing the content of the video segments. The identified video segments from the geotagged video database can then be used as reference to encode (36) segments of the captured video sequence using predictions to increase compression.

Figure 4:
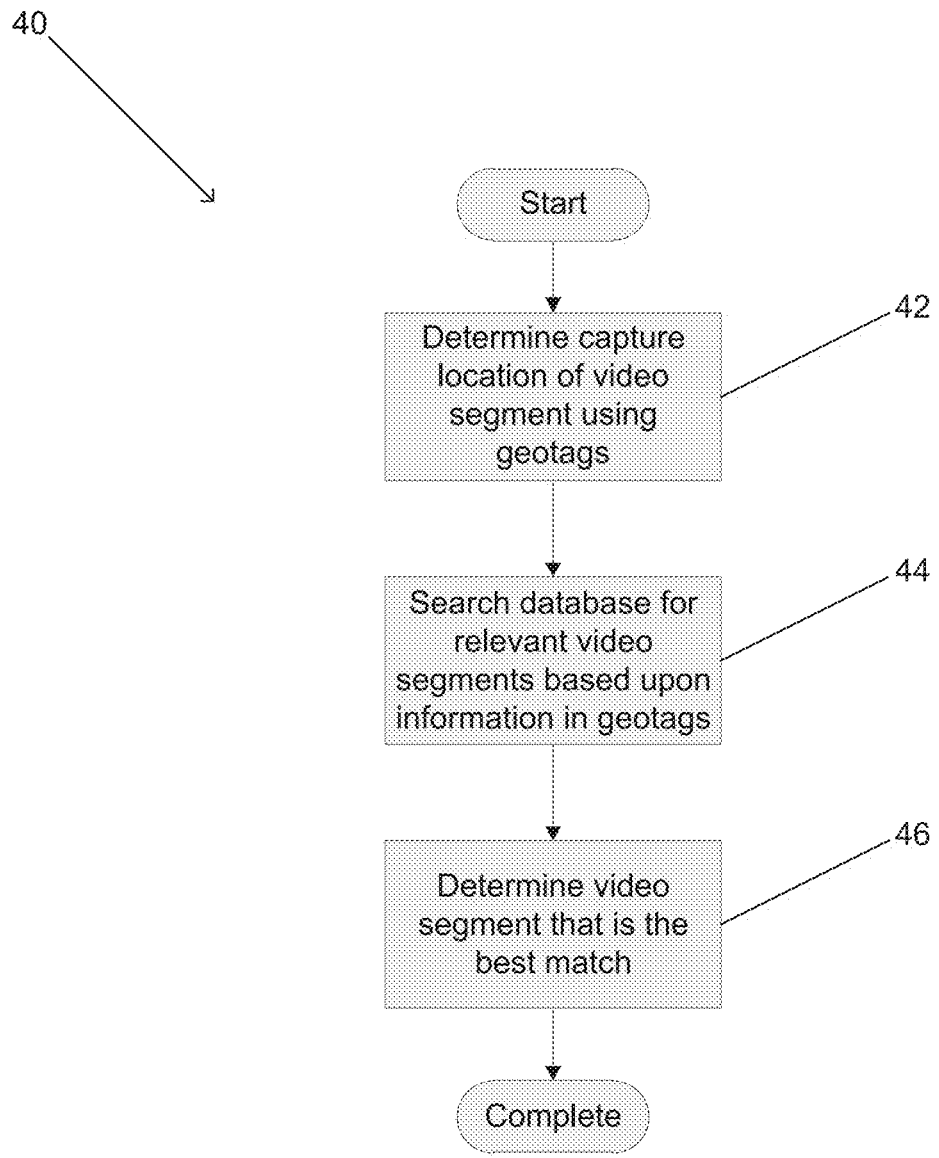
FIG. 4 is a flowchart illustrating a process for identifying a video segment within a geotagged video database that is the closest match to specific video segment in accordance with an embodiment of the invention.

A process for locating a segment of video containing a similar view to a segment of video from a captured video sequence is illustrated in FIG. 4. The process 40 includes determining the capture location of a segment from the captured video sequence using one or more geotags associated with the captured video sequence. The capture location can be considered the geographic location from which a specific video sequence, video segment, and/or video frame (depending on the granularity of a geotag) was captured. In many embodiments, the captured video sequence includes one or more geotags associated with the entire video sequence. In several embodiments, individual frames of the captured video sequence include one or more geotags.

The geotag(s) associated with a video segment of the captured video are used to search (44) the geotagged video database for video segments that are likely to include similar views of the scene. The extent to which similar views of a scene can be identified based upon geotags is largely dependent upon the information contained within the geotags. The geotag metadata usually includes latitude and longitude coordinates. These coordinates can be utilized to identify video segments that were captured from geographically proximate locations. Additional information in a geotag such as (but not limited to) the capture altitude, bearing, and tilt can provide information concerning the specific view of the scene captured by the video segment. Also, accuracy data, time of day, date and place names can be utilized to determine the similarity of the viewpoints from which the video segments were captured.

The geotags enable the identification of a set of video segments that are likely to contain similar views of the scene recorded in a captured video segment. The video segment that provides the best match as a reference segment for the purposes of encoding the captured video segment can be determined (46) by performing view matching. View matching involves comparing the content of one or more frames of the video segments from the geotagged video database with the video segment from the captured video sequence. The video segment that contains the content that is the most similar can be used in the encoding of the captured video segment. The criteria that can be used in the determination of the similarity of the content of frames and the video segment most suited for use in the encoding of another video segment are discussed further below.

Although specific processes are illustrated in FIGS. 3 and 4 for encoding captured video sequences using predictions based upon reference video segments from a geotagged video database, any of a variety of processes can be utilized to identify video segments containing similar views of scenes recorded in a captured video sequence and for encoding the captured video sequence using predictions from frames in reference segments to increase compression in accordance with embodiments of the invention. Processes for identifying video segments that are likely to contain similar views based upon geotags and for determining the similarity between video segments based upon the content of the video segments in accordance with embodiments of the invention are discussed further below.

Locating Video Segments Containing Similar Views of a Scene

Video segments contained within a geotagged video database contain views of a variety of scenes. Processes for encoding a captured video sequence in accordance with embodiments of the invention, can involve identifying video segments from one or more video sequences in the geotagged video database that can be utilized as reference segments during encoding. Geotags can be utilized to perform a coarse search of the geotagged video database to locate video segments that are likely to contain similar views of a scene recorded in a segment of the captured video sequence. The video segments that contain similar views, however, are likely to exhibit variation in appearance and viewing parameters as they may be acquired by an assortment of cameras at different times of day and in various ambient lighting conditions. Typical multiview algorithms consider images with far less appearance variation, where computing correspondence is significantly easier, and have typically operated on somewhat regular distributions of viewpoints (e.g. photographs regularly spaced around an object, or video streams with spatiotemporal coherence). As the amount of video stored in the geotagged video database increases, there should be a large subset of video segments of any particular scene that a video segment with matching lighting, weather, and exposure conditions, as well as sufficiently similar resolution can be identified. By automatically identifying video segments in the database that are compatible with video segments from the captured video sequence, muliview video encoding techniques can be used to encode the frames of video of the new sequence using segments of video from the database as the baseline view.

Locating Video Segments Using Geotags

Figure 5:
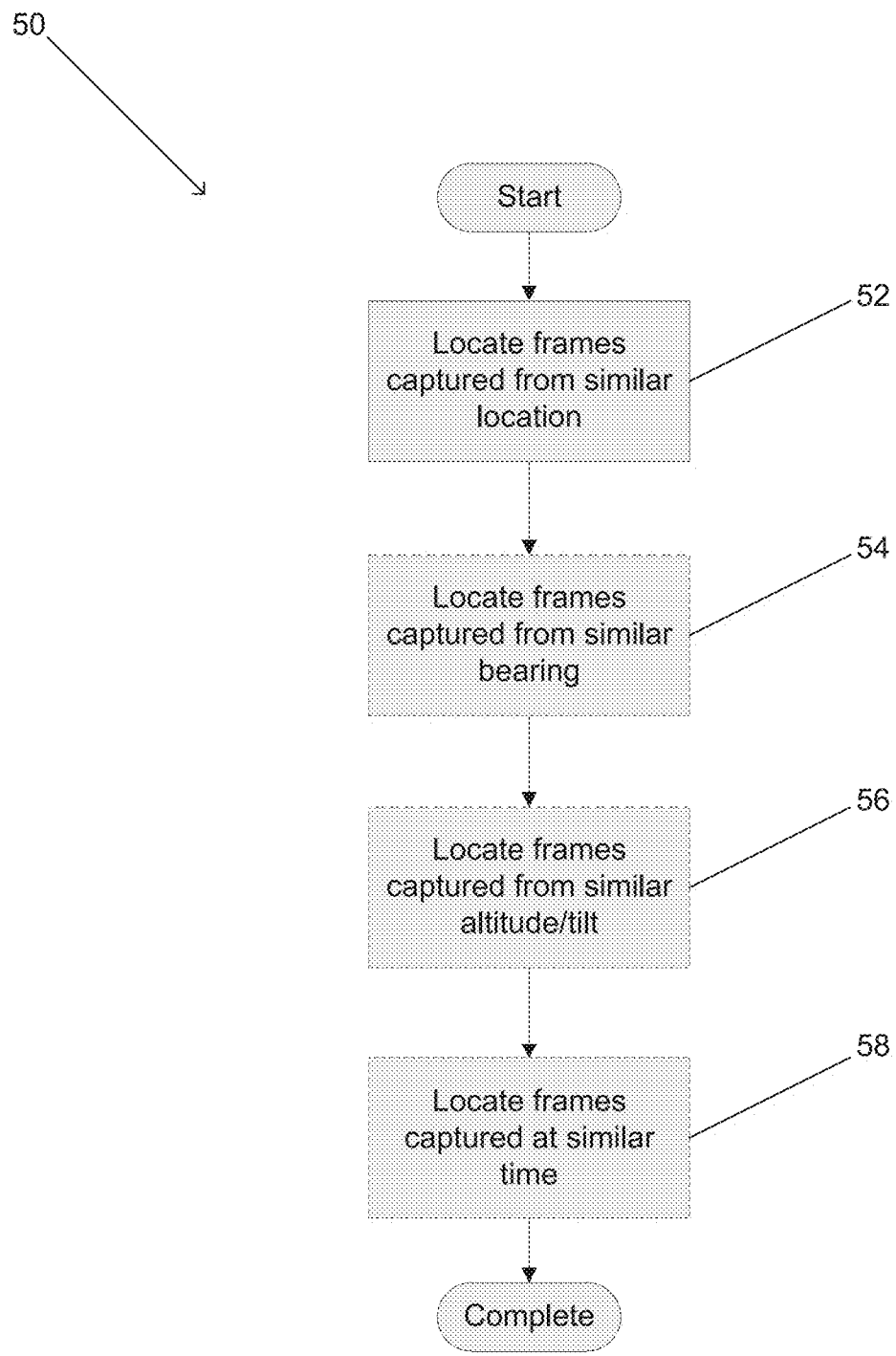
FIG. 5 is a flow chart illustrating a process for identifying video segments within a geotagged video database that are likely to contain similar views of a scene recorded in a specific video segment using geotags in accordance with an embodiment of the invention.

A process for using geotags to locate video segments that are likely to be similar to a captured video segment in accordance with an embodiment of the invention is illustrated in FIG. 5. The process 50 includes locating (52) video segments including at least one frame of video captured from a similar geographic location as a frame of video in the captured video segment. In many embodiments, the measure of whether a video segment is captured from a similar geographic location is adaptive and the process returns a predetermined number of video segments closest to a geographic location. In other embodiments, alternative adaptive techniques are utilized and/or predetermined distance thresholds are imposed when determining the similarity of the geographic location of two video segments.

In situations where a geotag only includes the geographic location of a video segment, a greater burden is placed on the comparison of the content of the video segments in order to determine the video segment that is the best match for encoding the captured video segment. If additional information concerning the direction from which a video segment was captured is available, the additional information can be used to obtain a better initial set of video segments (i.e. a set that is much more likely to include views of the scene recorded in the captured video segment). In this way, less processing is involved in determining the sequence that is the best match as fewer sequences are considered. In the illustrated embodiment, geotags are used to identify video segments that more closely correspond to a captured video segment by comparing the bearing (54), the altitude and/or tilt (56), and time (58) at which frames in the video segments were captured. Ideally, the frames that include the closest matches in location, bearing, altitude/tilt, time of day, and date are likely to have the closest similarity to the captured video segment. The relative weighting of each of these parameters will typically depend upon the requirements of a specific application. For example, the importance of the date can drop off considerably with increasing distance in time. Alternatively, the time of day and/or time of year can be considered in combination to determine the similarity of ambient lighting conditions. In several embodiments, the geotags can also include temperature and other information including (but not limited to) light levels and humidity. Accordingly, the specific factors that are considered when identifying video segments from a geotagged video database that are likely to contain similar views of a scene recorded in a captured video sequence are typically only limited by the requirements of a specific application. Once video segments within a geotagged video database that are likely to contain a similar view of a scene recorded in a captured video segment are identified using geotags, the video segment in the geotagged video database that is the closest match to the captured video segment can be identified by a comparison of the content of the video segments.

Determining Similarity Based on Content of Video Segments

Figure 6:
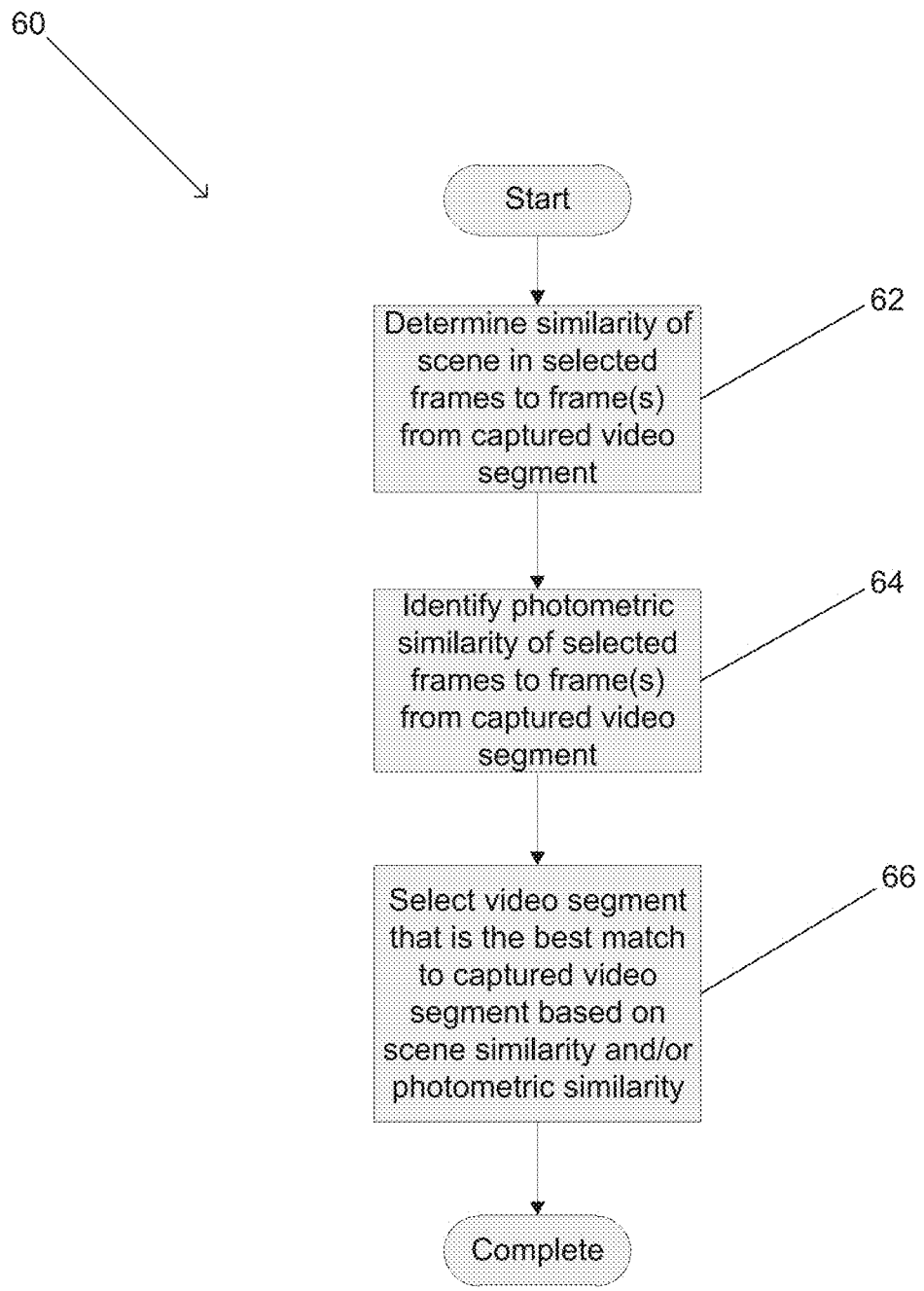
FIG. 6 is a flow chart illustrating a process for identifying a video segment that most closely matches a specific video segment in accordance with an embodiment of the invention.

Matching processes in accordance with embodiments of the invention attempt to locate frames of video that are good matches to frames of video in a captured video segment based upon factors including (but not limited to) scene content, appearance, and scale. A process for identifying a video segment from a set of video segments (identified using geotags) that is the best match to a captured video segment in accordance with an embodiment of the invention illustrated in FIG. 6. The process 60 includes determining (62) the similarity of the scene in one or more frames of a video segment from the geotagged video database to one or more frames in the captured video segment. In addition, the process involves determining (64) the photometric similarity of one or more frames of a video segment from the geotagged video database to one or more frames in the captured video segment. Based upon the similarity of the scene and the photometric similarity of the video segments, a video segment from the geotagged video database can be selected (66) as the best match. As noted above, the captured video segment can then be encoded using predictions based upon the selected video segment.

A variety of processes can be utilized for determining (62) the similarity of the scene in different frames of video in accordance with embodiments of the invention. The term structure from motion (SfM) in image processing describes the problem of attempting to recover the 3D geometry of a scene using images obtained from an uncalibrated camera. A variety of techniques have been developed for determining the number of shared feature or correspondence points between images for use in SfM applications. In a number of embodiments, similar techniques are utilized to determine shared feature points between a frame of video from the geotagged video database and a frame of video from a captured video segment. The frames with the most shared feature points tend to be nearly collocated. In a number of embodiments, the shared feature points are determined using a scale-invariant feature transform (SIFT) feature detector that is capable of determining matches between images of substantially different resolutions. In other embodiments, any of a variety of processes can be utilized to determine the similarity of the scenes recorded in a frame of video from the geotagged video database and a frame of video from a captured video segment.

In addition to determining consistency of the scene using feature points, the photometric consistency of the frames can be determined (64) using a variety of metrics. In several embodiments, mean-removed normalized cross correlation is utilized to identify photometric consistency between matching frames. In other embodiments, any of a variety of other robust matching metrics can be utilized including (but not limited to) metrics that have been developed to enable matching with variable lighting, variable focus, non-Lambertian reflectance, and large appearance changes.

In a number of embodiments, processes that look at a variety of characteristics of one or more frames when comparing video segments can be utilized including processes that compare mean, variance, and/or skew of the RGB or YUV components and/or in a manner similar to that outlined in U.S. Pat. No. 6,246,803, entitled "Real-Time Feature-Based Video Stream Validation and Distortion Analysis System Using Color Moments", to John Gauch (the disclosure of which is incorporated by reference herein in its entirety).

In many embodiments, the geotagged video database includes video segments captured by the same recording device that captured the video sequence that is being encoded. Video sharing systems that receive video captured by always on video recording devices, in particular, are likely to contain large amounts of video data captured by a single recording device. The geotagged video database can contain information concerning the recording device that captured individual video segments including but not limited to information that uniquely identifies recording devices and product information that indicates a type or product category of a recording device, which may be as specific as the lens and sensor configurations. In several embodiments, the process of locating a video segment containing a similar view of a scene to a captured video segment can be limited (initially) to video segments captured using the same recording device. In a number of embodiments, the cost function utilized to determine the video segment that is the best match to the captured video segment considers whether a video segment was captured using the same recording device and/or the same type of recording device.

As can be readily appreciated, the efficiency of the encoding process is largely dependent on the similarity (i.e. redundancy) between the video segments. In several embodiments, a cost function is utilized to determine the video segment that is the closest match based upon the similarity of the scene and the photometric consistency between the frames of the video segments. In many embodiments, the cost function more heavily weights the similarity between the intra-frame(s) in the video segments in recognition that the greatest compression can be achieved by replacing intra-frame(s) with frames encoded using predictions that reference a similar frame from a reference segment. As is discussed further below, several encoding processes in accordance with embodiments of the invention only use predictions from frames within reference segments in the encoding of intra-frames. In which case, the search for matching video segments is reduced to a search for frames that match the intra-frames of the captured video segments. Processes for encoding captured video segments using prediction based upon reference video segments contained within a geotagged video database in accordance with embodiments of the invention are discussed further below.

Encoding Captured Video Segments Using Predictions from Reference Segments

The simplest and largest improvement in the encoding of a captured video sequence is obtained when intra-frames are encoded using predictions from frames in reference segments. Additional encoding efficiency gains can be obtained by using predictions that reference frames in reference segments in the encoding of additional frames in a captured video sequence. The number of frames of a captured video sequence that can be encoded using predictions to a reference segment can depend upon the similarity of the frames of a segment of the captured video sequence to the reference segment. Where there is a low likelihood that an entire video segment that is similar can be located within a geotagged video database, then a video sharing system in accordance with embodiments of the invention can simply search for intra-frames or anchor frames in the geotagged video database that correspond to the intra-frames within a captured video segment (or simply encode the video segment using intra-frame and inter-frame predictions). Where there is a high likelihood that a similar video segment can be located within a geotagged video database, then the captured video segment can be encoded in a similar manner to an enhancement view in multiview encoding.

Encoding Intra-Frames Using Reference Frames from Other Segments

In a number of embodiments, the video segments from a captured video sequence that are encoded using predictions to reference segments retrieved from a geotagged video database are single intra-frames. In this way, compression is achieved by simply matching single frames between the captured video sequence and frames within the geotagged video database. The encoding of intra-frames in a captured video segment using predictions to reference frames from a video segment from a different video sequence in accordance with embodiments of the invention is conceptually illustrated in FIG. 7. A video segment from a geotagged video database constitutes a reference segment. In the illustrated embodiment, the reference segment includes an intra-frame 710 and a plurality of additional frames (712) encoded using inter-frame prediction. A captured video segment is represented by a second sequence of frames. The captured video segment is encoded so that the initial frame is encoded using predictions that include references to a frame in the reference segment. The additional frames (722) of the captured video segment are encoded using inter-frame prediction, but not utilizing predictions that reference frames of the reference segment. By only using predictions to the reference segment in the encoding of the initial (intra-frame) in the captured video segment, the relative frame rate of the reference segment and the captured segment is largely irrelevant. In addition, the amount of additional overhead in streaming the captured video segment and the reference frames from the reference segment is approximately equivalent to the size of the frames in the captured video segment that reference the reference segment (i.e. the remaining frames from the reference segment need not be streamed in order to decode the captured video segment). In many instances, photometric differences between an intra-frame of a captured video segment and an intra-frame of a reference segment can decrease encoding efficiency. Accordingly, filters can be applied to the reference segment to compensate for variations in photometric differences including (but not limited to) variations in the focal distance used by the video recording devices to capture the video segments. Application of filters in this way can increase the compression achieved through use of predictions that include references to frames in reference segments. In a similar way, resampling the reference segment to the same resolution as the captured video segment prior to generating predictions can accommodate resolution differences. As is discussed below, the decoding of captured video segments encoded using reference segments of a different resolution also involves resampling the reference frames prior to decoding the encoded video segment. Ideally, the resampling processes used in the encoding and the decoding are the same or vary within a margin that is appropriate to the requirements of a specific application.

Although specific processes are discussed above involving the encoding of intra-frames of a captured video segment using predictions that include references to frames in a reference segment, predictions can be made based upon reference frames that themselves encoded using predictions that reference frames in yet another reference segment. Accordingly, the encoding of a captured video segment in accordance with embodiments of the invention can depend upon multiple video segments within a geotagged video database. In addition, systems and methods in accordance with embodiments of the invention are not limited to simply using predictions based on reference frames in video segments from different video sequences in the encoding of intra-frames of a captured video segment. Systems and methods for encoding captured video segments using predictions that include references to multiple frames in a reference segment in accordance with embodiments of the invention are discussed further below.

Compressing Video Segments Using Multiview Encoding

In many embodiments, captured video segments are encoded using predictions that reference multiple frames in reference segments from a geotagged video database. The encoding of a captured video segment using predictions that include references to multiple frames in a reference segment from a different video sequence in accordance with embodiments of the invention is conceptually illustrated in FIG. 8.

A video segment from a geotagged video database constitutes a reference segment. In the illustrated embodiment, the reference segment includes an intra-frame 810 and a plurality of additional frames (812) encoded using intra-frame, and/or inter-frame prediction. A captured video segment is represented by a second sequence of frames. The initial (intra-frame) frame 820 and the additional frames (822) of the captured video segment are encoded using predictions that include predictions to the frames of the reference segment. In the illustrated embodiment, the captured video segment is encoded using predictions that include references to frames in the reference segment. In many embodiments, a captured video segment can be encoded using reference frames that are themselves encoded using predictions to reference frames in another video segment. Accordingly, a captured video sequence can be encoded in a way that reduces the number of dependencies to video segments in a geotagged video database.

Figure 7:
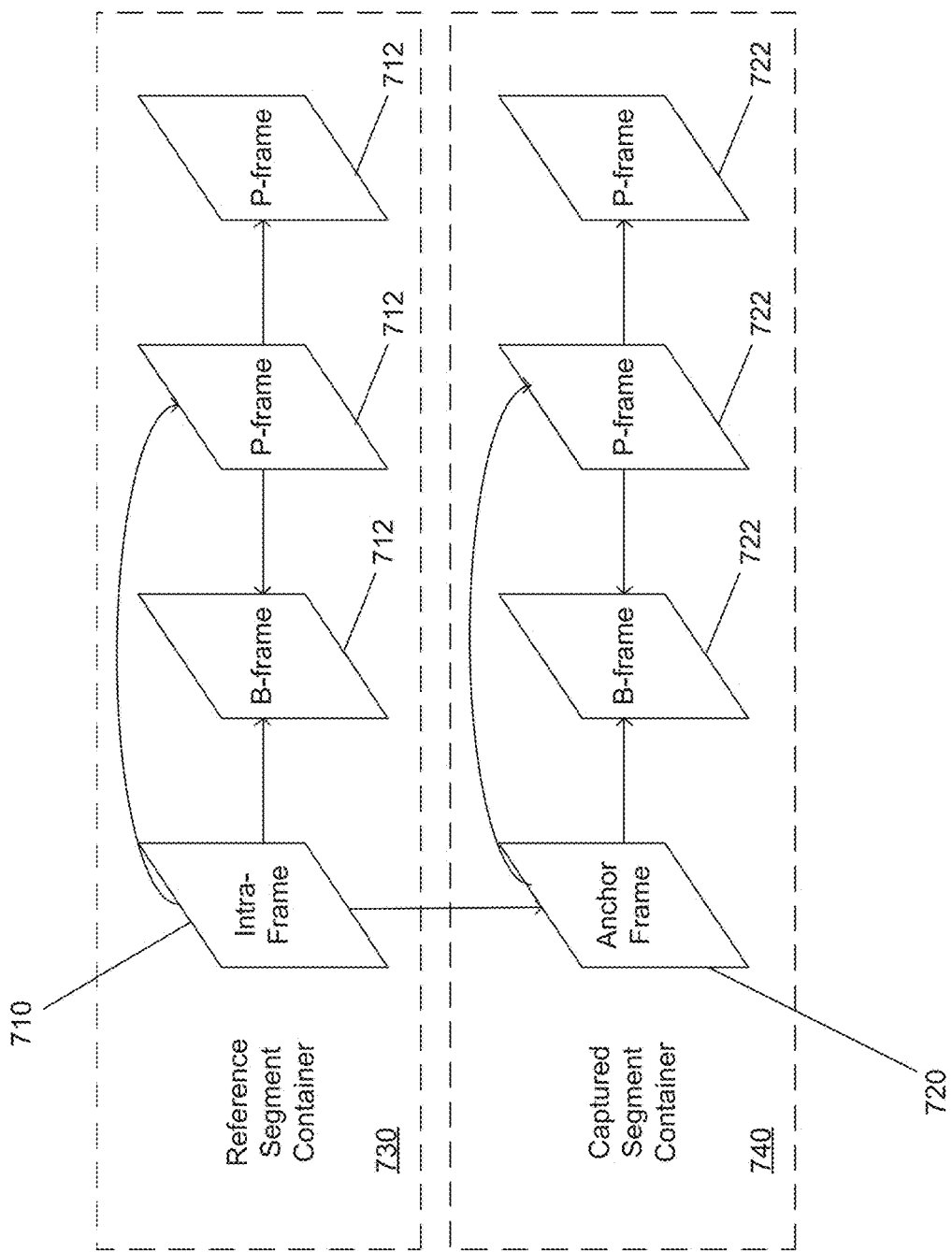
FIG. 7 conceptually illustrates encoding of a video segment using prediction with respect to intra-frames in a captured video segment and storage of the encoded video segment in a container file in accordance with embodiments of the invention.
Figure 8:
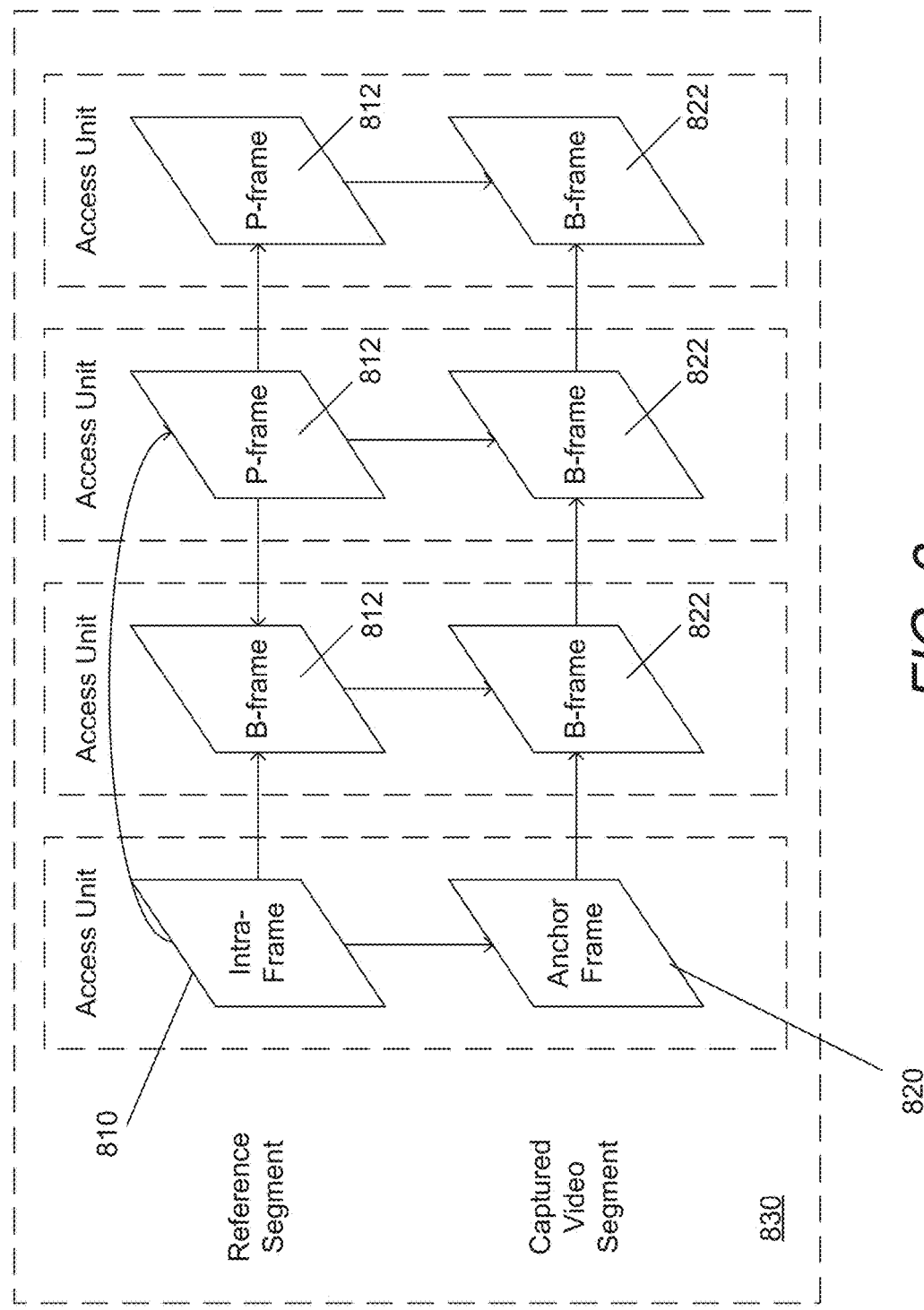
FIG. 8 conceptually illustrates encoding of a video segment using inter-frame prediction and predictions based on reference frames from another video segment and storage of the encoded video segment in a container file containing reference frames in accordance with embodiments of the invention.

When compared to the encoding techniques illustrated in FIGS. 7 and 8, the encoding illustrated in FIG. 8 involves utilizing similarities between entire video segments instead of just between intra-frames. When the video segments are captured from similar viewpoints and at similar frame rates, the encoding process is somewhat analogous to conventional multiview encoding. When the video segments are encoded at different frame rates or the video recording devices were in motion at different velocities (particularly relevant to "always on" cameras), then the encoding process becomes more complicated. Instead of each of the frames in the video segments corresponding, the frames in the captured video segment may correspond to a subset of the frames in the reference segment. In addition, only a subset of the frames in the captured video segment may correspond to all or a subset of frames in the reference segment. As is discussed below, these correspondences can still provide significant efficiency gains in the encoding of the captured video segment. When the video segments are encoded at different resolutions, then the encoding process is also more complicated. Relevant frames from a reference segment can be resampled to the resolution of the frames in a captured video segment. These resampled frames can then be used as reference frames in the encoding of the captured video segment. Likewise, during decoding the relevant frames of the reference segment are resampled prior to being used as reference frames in the decoding of the encoded video segment. Ideally, the resampling processes used in the encoding and the decoding are the same or vary within a margin that is appropriate to the requirements of a specific application.

Improving Encoding Efficiency of Rate of Video

When a video sequence is captured at a high velocity (i.e. the video recording device is in motion) and/or at a low frame rate, significant compression gains can be obtained by using predictions based upon another video segment captured at a slower velocity and/or a higher frame rate. At high velocity or low frame rate, prediction between frames in the captured video sequence may be inaccurate leading to inefficiency in the video encoding process (efficiency is directly tied to the accuracy of predictions). As noted above, the velocity at which a scene is captured and the frame rate at which the scene is captured can have similar impacts on encoding efficiency and can be collectively referred to as the rate of the video. A high rate corresponds to a low velocity and/or high frame rate. A low rate corresponds to a high velocity and/or low frame rate. Where a geotagged video database contains a similar video segment captured at a higher rate (i.e. lower velocity and/or higher frame rate), use of the higher rate video segment as a reference segment can improve the efficiency of the encoding of the captured video sequence by providing reference frames from which better predictions can be made than the predictions that are possible using inter-frame prediction alone.

In several embodiments, a geotag including velocity information associated with a frame that is being encoded can be utilized to apply a filter such as (but not limited to) a filter that applies blur simulating motion blur can be used to increase the similarity of a frame in a reference segment. In this way, additional compression gains can be obtained through application of the filter. In several embodiments, the blurring may take place individually on each frame, or alternatively by applying transformations on a combination of two or more frames. In a number of embodiments, a similar effect can be achieved using bi-predictive filtering utilizing the preceding frame in the captured video segment and the reference frame selected from the reference video segment. In other embodiments, any of a variety of filters can be applied to the references of a reference segment to increase similarity to a frame of a captured video segment.

Figure 9:
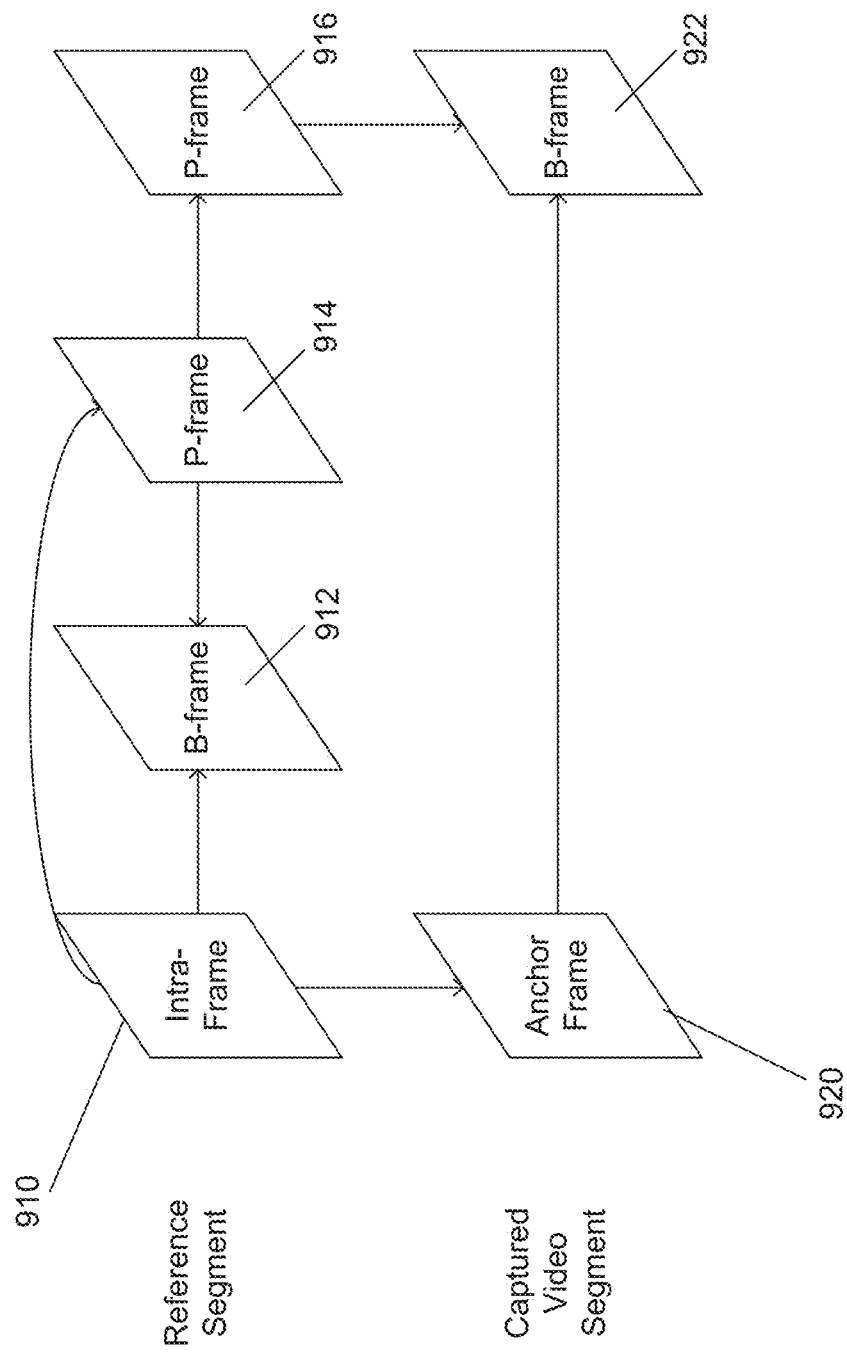
FIG. 9 conceptually illustrates the encoding of a video segment using predictions based on reference frames from another video segment that are selected based upon the relative velocity of the recording devices that captured the video segments in accordance with embodiments of the invention.

The encoding of a captured video segment using predictions based on a higher rate reference segment located within a geotagged video database in accordance with embodiments of the invention is conceptually illustrated in FIG. 9. A video segment from a geotagged video database constitutes a reference segment. In the illustrated embodiment, the reference segment includes an intra-frame 910 and a plurality of additional frames (912, 914, 916) encoded using intra-frame prediction, and/or inter-frame prediction. A captured video segment is represented by a second sequence of frames. The captured video segment is captured using a video recording device travelling at a higher velocity with respect to the scene than the relative velocity of the video capture device used to capture the reference segment (i.e. at a lower rate to the reference segment). Although FIG. 9 is discussed in the context of the velocity at which the video segments were captured, similar techniques can also be utilized where the reference segment is captured at a higher frame rate than the captured video segment.

The two video segments are not synchronized and so the encoding process identifies the video frame within the reference segment that is most similar to the second frame (922) of the captured video segment. The second frame of the captured video segment can then be encoded at increased efficiency using predictions that include references to the identified frame from the reference segment. As noted above, a filter can be applied to a frame in the reference segment or a plurality of frames in the reference segment based upon velocity information in a geotag associated with the frame being encoded to increase the similarity of the reference frame. In several embodiments, the identification of the most similar frame from the reference segment is performed in a manner similar to that outlined above involving comparison of geotags and/or frame content. In a number of embodiments, the geotag information considered when identifying a similar frame in the reference segment includes velocity information in the geotags associated with each of the video segments. In many embodiments, the geotag information considered when identifying a similar frame includes location information associated with each frame. In this way, a distance baseline can be utilized to align the two video segments (as opposed to a time baseline). The process of comparing the similarity of the content of the frame can involve identifying frame(s) from the reference segment that are more similar than the previous frame in the video segment being encoded.

Although specific processes for encoding video segments using predictions based on reference segments in accordance with embodiments of the invention are discussed above, any of a variety of processes can be utilized to increase the encoding efficiency of a captured video sequence leveraging predictions based upon video segments contained within a geotagged video database in accordance with embodiments of the invention. Furthermore, the above processes with respect to encoding different views captured at different rates (velocity and/or frame rate) can be used generally including in multiview encoding, where the views are captured in a coordinated manner (e.g. fixed baseline, synchronized) at the same time. Processes for storing video encoded in accordance with embodiments of the invention are discussed further below.

Storing Dependent Streams in a Separate Container File

In several embodiments, each video segment contained within the geotagged video database is contained within a separate container file and the geotagged video database includes an entry with respect to a captured video sequence including metadata concerning the location of the video segments that are combined together to create the captured video sequence and can include an entry concerning the location of reference segments and/or reference frames within the geotagged video database. In several embodiments, the DivX Plus container file format specified by DivX, LLC of San Diego, Calif. is utilized to contain the video segments. In other embodiments, any container file format appropriate to a specific application can be utilized including (but not limited to) the MP4 container file format specified in the MPEG-4 specification and the Matroska Media Container (MKV) specified by the Matroska Non-Profit Organization. In many embodiments, each container file includes a header that includes parameters utilized to configure a decoder to decode the video segment(s) contained within the container file. In several embodiments, the container file includes an index enabling the retrieval of specific frames of video within the video segment.

Referring again to FIG. 7, the storage of a reference segment and a captured video segment in separate video container files in accordance with embodiments of the invention is illustrated. Unlike bitstreams encoded using MVC, where frames from different views are contained within the same access unit, information concerning reference frames from within the reference segment that are utilized in the decoding of the captured video segment is contained within metadata stored in the container file and/or in the geotagged video database. As is discussed further below, a video sharing system can then utilize the metadata identifying video segments and reference frames to retrieve all of the video data utilized in the decoding of the requested video sequence.

Although the embodiment illustrated in FIG. 7 includes a captured video sequence in which only the intra-frames were re-encoded using predictions that reference frames of a reference segment, separate container files can be utilized to store any video segment encoded in accordance with embodiments of the invention. Furthermore, systems and methods in accordance with embodiments of the invention are not limited to storing captured video segments in individual container files. Processes for storing multiple video segments encoded using predictions based on frames in a reference segment that is also contained within a single container file in accordance with an embodiment of the invention are discussed further below.

Storing Dependent Streams in a Single Container Files

Video segments are dependent when one video segment includes predictions based upon another video segment. In many embodiments, dependent video segments are multiplexed into a single container file so that referenced frames are located prior to the frame that includes the references. In a number of embodiments, the frames of the different video segments are combined into a single bitstream and frames that reference each other are contained within an access unit. Unlike video encoded using MVC, the different video segments are typically not synchronized and are captured at different times. In addition, the video segments may be captured at different frame rates, resolutions, and/or aligned relative to each other based upon a distance baseline instead of a time baseline. Storing dependent video segments in a single container file can simplify the process of decoding one of the video segments, because all of the video data utilized to decode the video segment is stored with the video segment. Where an encoded segment includes dependencies to multiple reference segments, the frames of each segment are multiplexed together so that the frames from the various segments are ordered so that each frame that is utilized as a reference frame is located prior to the frames that reference it in the container file. In addition, information concerning the dependencies between frames is included within the container file. Unlike MVC, where access units define frames that can be reference frames between views, the reference frames are specifically identified within the container file.

Referring again to FIG. 8, a pair of video segments stored within a single container file 830 is shown. The video segments are captured at the same frame rate and so a frame from each video segment is contained within each access unit. In several embodiments, the video segments are captured at different frame rates, different resolutions, and/or with the video recording devices travelling at different velocities relative to the scene. Accordingly, some access units may contain a single frame of video. In a number of embodiments, dependent frames are not stored in the same access unit. Instead, the frames are multiplexed into a container file so that related frames are grouped within the container. The video segments are, however, encoded as separate bitstreams.

Although specific techniques for storing video segments encoded in accordance with embodiments of the invention are disclosed above with respect to FIGS. 7 and 8, any of a variety of techniques can be utilized to store video segments within a geotagged video database in accordance with embodiments of the invention. Processes for distributing video sequences stored within a geotagged video database in accordance with embodiments of the invention are discussed further below.

Distribution of Content

Video sharing systems in accordance with embodiments of the invention can receive requests to access video sequences stored within the geotagged video database. The manner in which the video sequences are accessed can depend upon the capabilities of a playback device and/or the requirements of a specific application. In many embodiments, the video sharing system streams requested video sequences to playback devices for decoding. In several embodiments, playback devices download video sequences from the video sharing system and (progressively) playback the downloaded video sequences. In many instances, the requested video sequence will be a conventional bitstream and the playback device can playback the video sequence directly. Where the video sharing system has divided the video sequence into video segments, the playback device may need to request and assemble the video segments in an appropriate order. Typically, information concerning the assembly of video segments to reconstruct a requested video sequence can be obtained from the video sharing system using a mechanism such as (but not limited to) a top level index file including the locations of each of the video segments and the playback order of the video segments. In several embodiments, the top level index file is generated when the video sequence is stored in the geotagged video database. In other embodiments, the top level index file is dynamically generated in a manner similar that described in U.S. patent application Ser. No. 13/341,801, filed Dec. 30, 2011 and entitled "Systems and Methods for Performing Adaptive Bitrate Streaming Using Automatically Generated Top Level Index Files", the disclosure of which is incorporated by reference herein in its entirety.

In a number of instances, a requested video sequence will include one or more video segments encoded using predictions that include references to a reference segment. In several embodiments the video sharing system provides the requested video sequence, and the reference segments upon which segments of the requested video sequence depend and the playback device decodes the requested video sequence using the reference segments. In a number of embodiments, the video sharing system multiplexes the requested video sequence and the reference segments into a container file in response to the request and the container file is provided to the playback device. In certain embodiments, the container files are cached to reduce server load with respect to frequently requested video sequences. In many embodiments, the video sharing system transcodes the segments of the requested video sequence that include predictions to reference segments to provide the playback device with a conventional video bitstream. Processes for transcoding and decoding video encoded in accordance with embodiments of the invention are discussed further below.

Distributing Encoded Content

When a playback device that includes a video decoding system requests a video sequence that includes segments encoded using predictions that reference frames of reference segments, a video sharing system in accordance with embodiments of the invention can provide the requested video segments and all of the frames referenced in the encoding of the requested video segments. In this way, the playback device is provided with all of the video data to decode and playback the video sequence.

Figure 10:
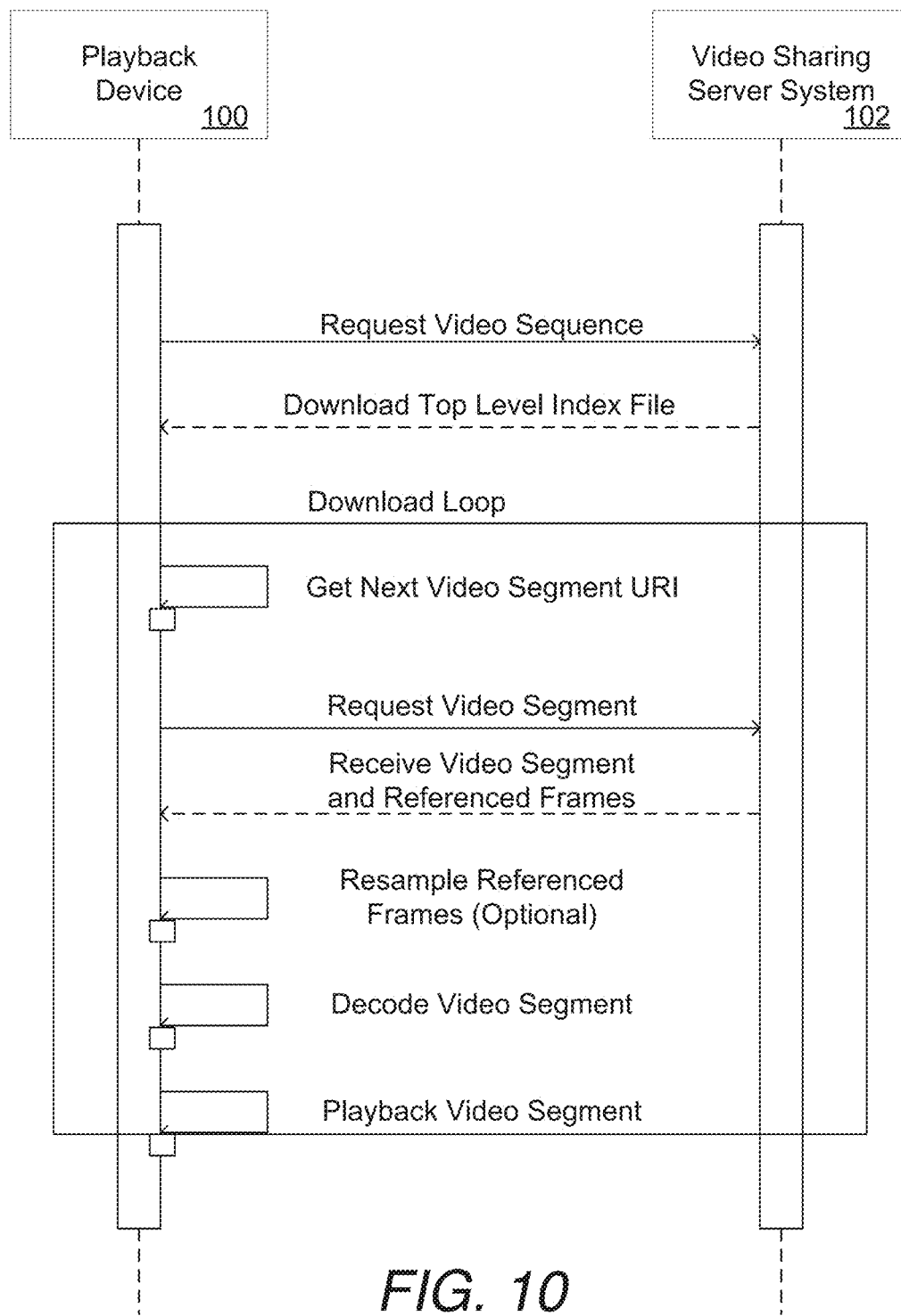
FIG. 10 is a timing diagram showing communication between a playback device and a video sharing server system during the downloading of video segments and reference frames from the video sharing server system by the playback device, and during the decoding and playback of the video segments by the playback device in accordance with an embodiment of the invention.

A timing diagram illustrating communication between a playback device and a video sharing server system during the decoding and playback of a video segment encoded using predictions that reference frames in reference segments in accordance with an embodiment of the invention is illustrated in FIG. 10. A playback device 100 initiates the download by requesting a video sequence from a video sharing server system 102. In response to the request, the video sharing server system is provided with access to a top level index file containing the location(s) of one or more video segments that combine to form the requested sequence. In the illustrated embodiment, the location(s) of the one or more video segments are indicated using URIs. The top level index file can be stored on the video sharing server system or dynamically generated based upon metadata stored in a geotagged video database concerning the location of encoded video segments and reference frames. In other embodiments, any of a variety of techniques can be utilized to provide a playback device with information concerning the location of the video segments that make up a requested video sequence.

Using the top level index file, the playback device 100 enters a download loop in which the playback device selects one or more URIs associated with the next video segment to be played back in the video sequence and requests the video segment using the one or more URIs. In many embodiments, the one or more URIs enable the playback device to directly download the video segment and any frames referenced in the encoding of the video segment. In several embodiments, the video sharing server system receives the URI and queries a geotagged video database to locate metadata identifying the video segment and frames referenced in the encoding of the segment. The video sharing server system can then provide the identified information to the playback device for decoding. The playback device places frames in the video decoder's reference frame list and decodes the video segment using any referenced frames downloaded from the video sharing server system. Where the reference frames are encoded at a different resolution to the resolution of the video segment, the playback device can resample the frames to the resolution of the video segment prior to placing them in the decoder's reference list. The method used to perform the resampling during encoding and decoding may be the same, or similar within an acceptable error tolerance; otherwise, a mismatch in the resampling may lead to drift between the encoder and decoder's prediction processes. Factors that can influence the similarity of resampling processes include (but are not limited to) the filter length, filter taps, number of vertical lines, and/or boundary conditions applied during the resampling process. The resampling method may be predetermined, communicated via external means to the video file, or added as metadata concerning the encoded video segment to a container file or within the encoded video bitstream. The decoded video segment is then played back. The playback device can request the next video segment until all of the video segments in a video sequence are played back. As is illustrated in FIG. 2A, some of the video segments in a requested video sequence may not reference frames from a reference segment and can be decoded and played back in a conventional manner.

In embodiments where video segments are stored on a geotagged video database in separate container files, the top level index file can include references to the container file of the video segment and to the byte ranges of frames of video within another container file that are referenced in the encoding of the video segment. The playback device can then download the container file containing the video segment, the headers of the container file containing the referenced frames, and the referenced frames. Where dependent video segments are stored in the same container file within a geotagged video database, the playback device 100 can download the headers and index of the container file and use the index to identify the byte ranges of the container file to download to obtain the video segment and the frames referenced in the encoding of the video segment. A playback application on the playback device can handle providing the appropriate reference frames to a video decoder to enable decoding of the video segment. Alternatively, the playback device 100 can download the entire container file.

Although a specific process for downloading video segments and frames referenced in the encoding of the video segments is illustrated in FIG. 10, any of a variety of processes including multiplexing the requested video sequence and the reference segments into a container file on the fly can be utilized to enable downloading and playback video encoded in accordance with embodiments of the invention. Processes involving transcoding video segments encoded in accordance with embodiments of the invention to provide conventional bitstreams to playback devices are discussed further below.

Transcoding Content Prior to Distribution

As an alternative to providing playback devices with both video segments and any frames referenced in the encoding of the video segments, the bandwidth utilized during the downloading of a video segment can be reduced by transcoding a video segment into a conventional bitstream. A playback device receiving the transcoded bitstream can simply decode the transcoded bitstream using a conventional decoder.

Figure 11:
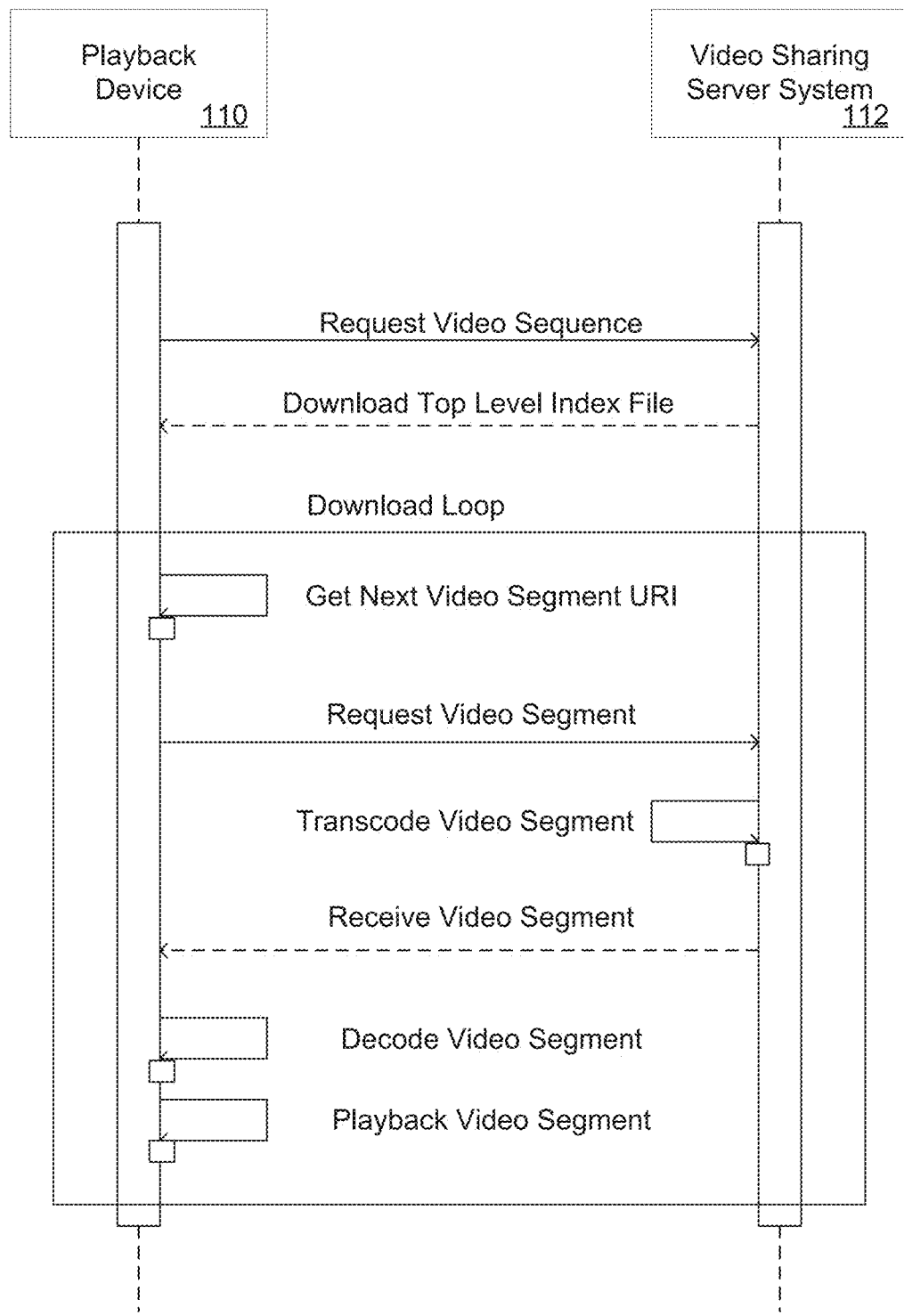
FIG. 11 is a timing diagram showing communication between a playback device and a video sharing server system during the transcoding of at least one video segment into a conventional video bitstream by the video sharing server system for downloading by playback device, and during the decoding and playback of the transcoded bitstream by the playback device in accordance with an embodiment of the invention.

A timing diagram illustrating communication between a playback device and a video sharing server system during the decoding and playback of a video segment encoded using predictions that include references to frames in reference segments in accordance with an embodiment of the invention is illustrated in FIG. 11. A playback device 110 initiates the download by requesting a video sequence from a video sharing server system 112. The video sharing server system 112 responds to a request to download a video segment encoded using predictions that include references to a reference segment by transcoding the requested video segment into a conventional bitstream prior to providing the video segment to the playback device. Where the reference segment is a different resolution to the video segment, then referenced frames in the reference segment are resampled to the resolution of the video segment prior to decoding. As noted above, ideally the same resampling process as used during encoding or a resampling process that yields an acceptable amount of error is utilized during the decoding process. The specific resampling process can be predetermined or determined based upon metadata describing the encoded video segment. The playback device 110 can then simply decode and playback the transcoded bitstream in a conventional manner.

Although specific processes for obtaining and playing back video sequences encoded in accordance with embodiments of the invention are illustrated in FIGS. 10 and 11, any of a variety of processes can be utilized to decode and playback video contained within a geotagged video database in accordance with embodiments of the invention.

Reducing Complexity of Decoding Processes

Multiview encoding processes typically support encoding a video segment using reference frames that can themselves be encoded using predictions that reference other video segments. Accordingly, the complexity of decoding a video segment typically depends upon the number of dependencies (i.e. the number of frames that are decoded during the process of decoding a specific frame). In several embodiments, the complexity of the decoding process is reduced by limiting the number of dependencies allowed when encoding a captured video segment. Accordingly, video sharing systems in accordance with a number of embodiments of the invention employ a cost function when determining the similarity in the match between frames and/or video segments that prefers video segments encoded without dependencies to other video segments. Similar cost functions can weight the desirability of a match inversely with the number of dependencies.

In many embodiments, a video sharing system can actively manage the dependencies within a geotagged video database to transcode video sequences that include predictions to reference segments and vice versa. In this way, the video sharing system can identify a video segment that is a good match for a captured video sequence and determine whether the sequence can be transcoded to become a reference segment that does not depend on other video segments. In the event that the reference segment on which the matching video segment depends does not include any (or many) dependencies, then the video segments can be transcoded so that the dependencies are reversed. In the event that a reference segment has many dependencies, the video sharing system can determine whether the reference segment is a suitable match (although not the best match) for encoding the captured video segment. In the event that the captured video segment is similar to several video segments that depend to the same reference segment, a determination can be made concerning whether greater encoding efficiency could be obtained over the set of video segments by shifting the encoding dependencies to another of the video segments (e.g. the captured video segment or the closest matching video segment). In this way, the video sharing system can actively manage the geotagged video database to continuously reduce the number of dependencies in the encoding of the video segments and to improve the overall compression of the database.

Playback Devices

Figure 12:
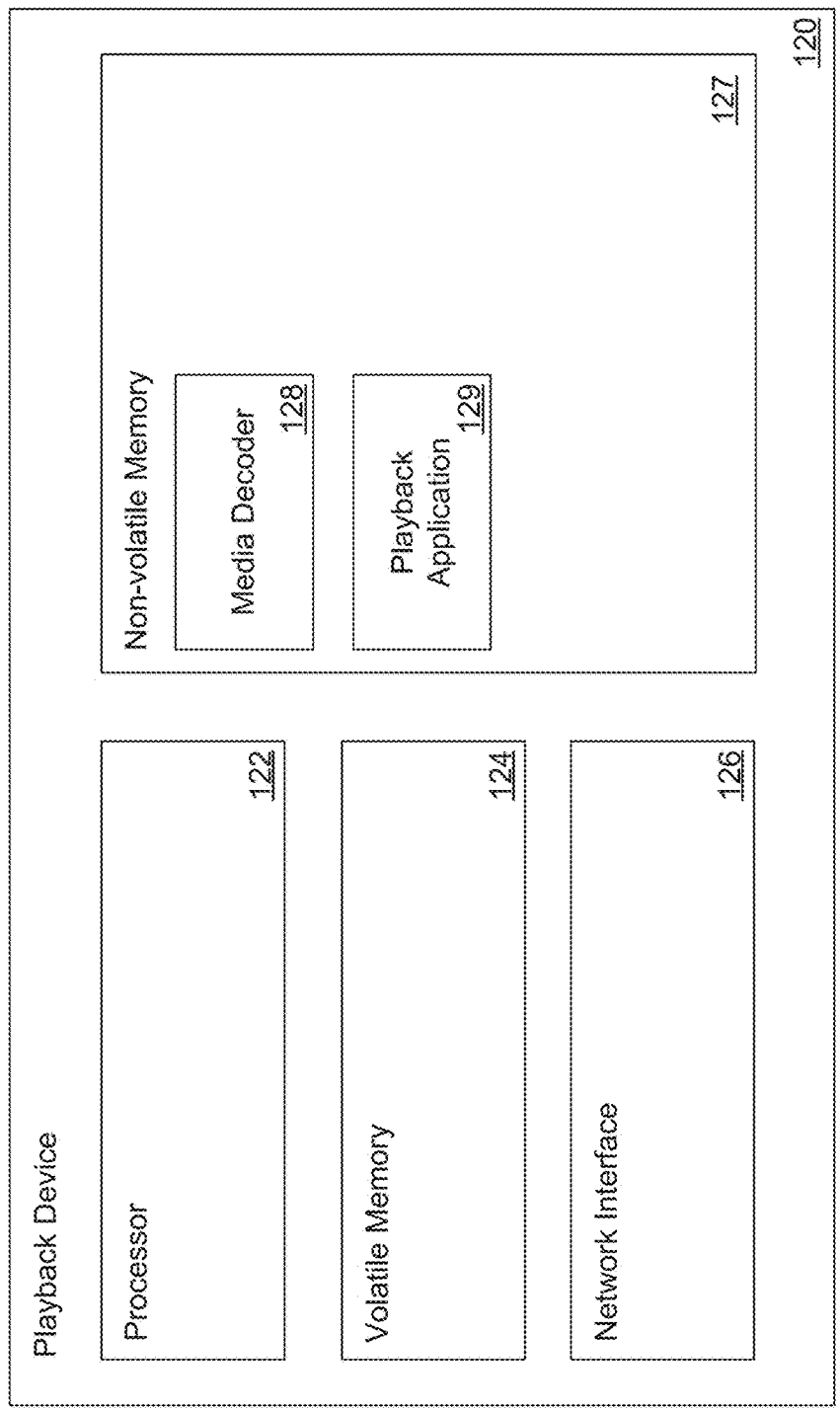
FIG. 12 conceptually illustrates a playback device in accordance with an embodiment of the system.

Playback devices in accordance with many embodiments of the invention are tasked with decoding video segments encoded using predictions based upon reference frames in unsynchronized video segments. A playback device including a video decoding system in accordance with an embodiment of the invention is illustrated in FIG. 12. The playback device 120 includes a processor 122, volatile memory 124, a network interface 126 and non-volatile memory 127. In the illustrated embodiment, the non-volatile memory includes a media decoder 128 and a playback application 129. In many embodiments, the playback application is configured to obtain encoded video segments and reference frames and to provide the encoded video segments and the reference frames to a media decoder in a way that enables the decoding of the video segments.

In several embodiments, the playback application 129 obtains a top level index file from a video sharing server system via the network interface 126. The top level index file provides information concerning files containing video segments and reference frames utilized in the decoding of the video segments. In a number of embodiments, the playback application 129 can utilize HTTP or a similar stateless (or stateful) protocol to request encoded video segments and reference frames via the network interface 126 in accordance with the information contained within the top level index file. In several embodiments, the playback application 129 obtains a first header including parameters for decoding a video segment and a second header including parameters for decoding reference frames in a second video segment. Where the encoding of the two video segments is sufficiently different (e.g. different resolutions), the playback application instantiates two media decoders 128 and configures the first media decoder with the first set of decoding parameters and configures the second media decoder with the second set of decoding parameters. The frames decoded by the second media decoder can then be provided to the reference frame list of the first media decoder for use in the decoding of the video segment using the first media decoder. Where there are differences in resolution, the playback application can resample the frames decoded by the second media decoder to the resolution of the first video segment prior to providing the reference frames to the first media decoder. As noted above, ideally the same resampling process as used during encoding or a resampling process that yields an acceptable amount of error is utilized during the decoding process. The specific resampling process can be predetermined or determined based upon metadata describing the encoded video segment. The metadata can be obtained separately from the encoded video segment and/or be embedded within the encoded video segment. In a number of embodiments, the decoders share a reference frame list. In yet other embodiments, a single decoder is instantiated and the video frames are decoded in bitstream order and according to the order of access units in the file, such that the reference frames from the reference segments can be utilized during decoding.

In a number of embodiments, a requested video segment and associated reference frames are contained in separate container files and the top level index file is used to obtain an index to the container file(s) containing the reference frames. The index(es) can then be used by the media decoder to obtain the reference frames from within each of the reference files.

Although specific playback devices are described above with respect to FIG. 12, any of a variety of playback devices can be utilized in accordance with embodiments of the invention including (but not limited to) playback devices in which the playback application 129 is downloaded and stored in volatile memory, and/or is stored elsewhere. In addition, playback devices in accordance with embodiments of the invention can implement a conventional media decoder and the complexity associated with the retrieval and decoding of the reference frames can be handles at the server, with the playback device receiving a conventional bitstream that can readily be decoded. Server systems that transcode video segments prior to providing requested video segments to playback devices in accordance with embodiments of the invention are discussed below.

Video Sharing Server Systems

Figure 13:
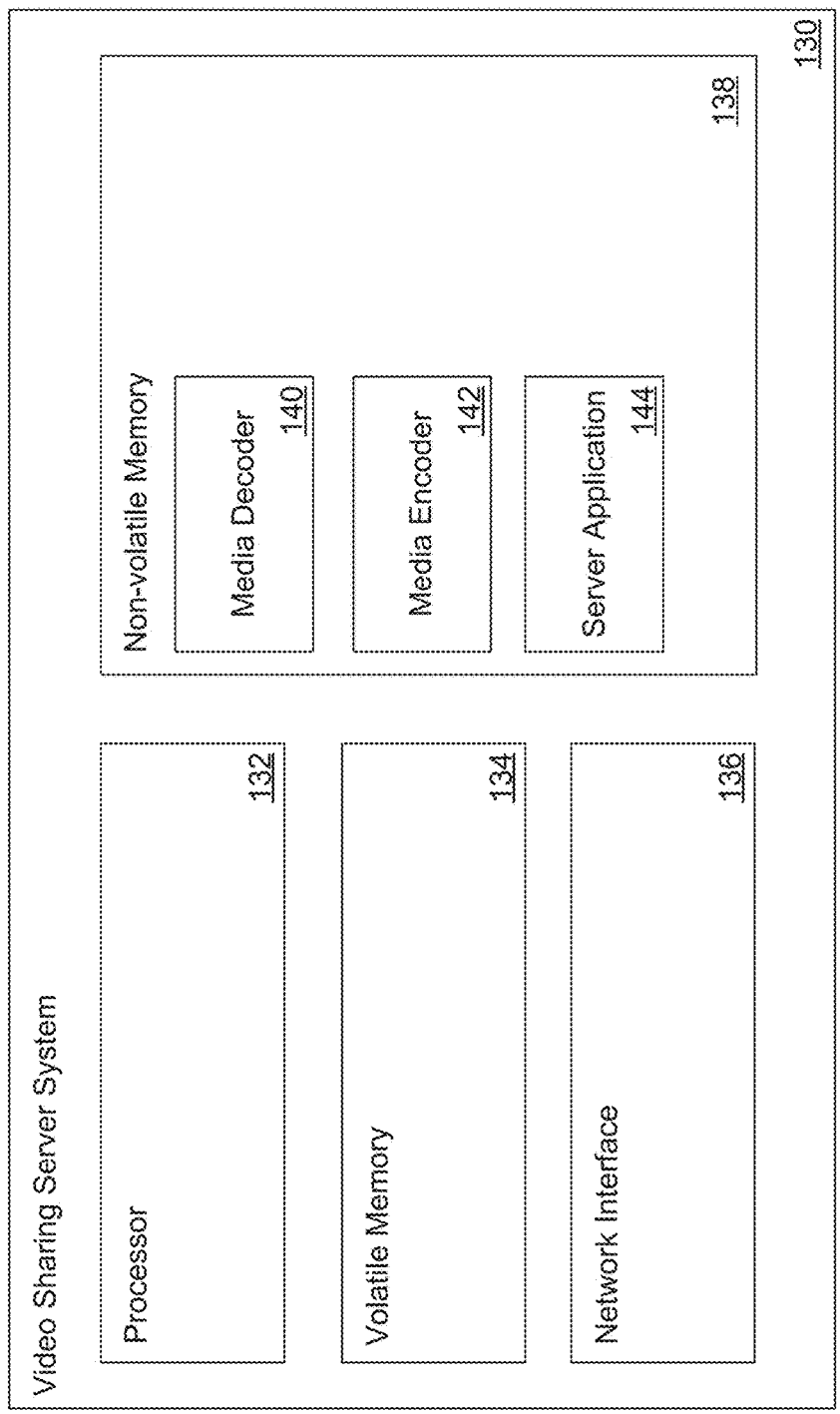
FIG. 13 conceptually illustrates a video sharing server system in accordance with embodiments of the invention.

Video sharing server systems in accordance with many embodiments of the invention can retrieve video segments and reference frames from a geotagged video database and transcode the video segments on the file into a conventional bitstream that can be readily decoded and played back by a conventional video decoder. A video sharing server system in accordance with an embodiment of the invention is illustrated in FIG. 13. The video sharing server system 130 includes a processor 132, volatile memory 134, a network interface 136, and non-volatile memory including a media decoder 140, a media encoder 142 and a server application 144. When the video sharing server application receives a captured video sequence, the server application 144 configures the processor to utilize the media encoder 142 to encode the video in the manner outlined above utilizing predictions that include references to frames in geotagged video segments (where possible) to achieve increased compression.

In a number of embodiments, the server application 144 responds to a request to access a stored video sequence by transcoding video segments that are part of the video sequence and which are encoded using predictions based upon reference frames contained within other video segments. The server application 144 transcodes the video segment by decoding the video segment in the manner similar to the decoding processes described above with respect to the playback device 120 illustrated in FIG. 12. Where the reference segment and the video segment being decoded have different resolutions, the reference frames from the reference segment are resampled to the resolution of the video segment prior to use in decoding. As noted above, ideally the same resampling process as used during encoding or a resampling process that yields an acceptable amount of error is utilized during the decoding process. The specific resampling process can be predetermined or determined based upon metadata describing the encoded video segment. The metadata can be located within the file containing the encoded video segment, within the encoded bitstream of the encoded video segment, and/or maintained in another location including (but not limited to) within the geotagged video database. The server application 144 then causes the decoded video segment to be reencoded as a conventional bitstream using the media encoder 142. The server application 144 can stream the transcoded video to a playback device using a stateful protocol. Alternatively, the server application 144 can complete the transcoding and generate a top level index file that can be utilized by a playback device to request the transcoded bitstream. In a number of embodiments, the server application 144 caches transcoded video segments. In circumstances where a transcoded video segment is repeatedly requested, the server application 144 can replace the encoding of the video segment in the database with the transcoded video segment to reduce the load on the server. In addition, the server application 144 can determine whether the transcoding of the video segment creates opportunities to otherwise the compress the video segments in the geotagged video database by transcoding the video segments on which the transcoded video segment previously depended to take advantage of the transcoded bitstream, which may be a better match (or a lower dependency match).

Although specific video sharing server systems are described above with respect to FIG. 13, any of a variety of video sharing server systems can be utilized in video sharing systems in accordance with embodiments of the invention including (but not limited to) video sharing server systems that simply handle generation of top level index files that point to the location of container files containing video segments on HTTP servers and/or within Content Distribution Networks. In addition, the processes described above as being performed by a video sharing server system should be understood as potentially being performed by several servers. Furthermore, the server application described above with respect to FIG. 13 should be appreciated as capable of being implemented as several separate applications and/or on different servers.

While the above description contains many specific embodiments of the invention, these should not be construed as limitations on the scope of the invention, but rather as an example of one embodiment thereof. For example, the use of the terms captured video sequence and captured video segment should be understood as being illustrative only and not limiting to encoding processes applied at the time of ingest into a geotagged video database. Encoding processes in accordance with embodiments of the invention can be applied to video segments previously stored within a geotagged video database and to reencode segments previously encoded in accordance with embodiments of the invention. Accordingly, the scope of the invention should be determined not by the embodiments illustrated, but by the appended claims and their equivalents.

What is claimed:

1. A method of encoding a video sequence using a geotagged video database, comprising:
    receiving a captured video sequence including at least one video segment at an encoding server, where at least one geotag indicating geographic capture location information is associated with the captured video sequence;
    selecting a segment from the at least one video segment in the captured video sequence using the encoding server;

determining geographic capture location information associated with the selected segment from the at least one geotag associated with the captured video sequence using the encoding server;

identifying a set of relevant video segments from a geotagged video database using the encoding server based on the geographic capture location information associated with the selected video segment, location information from geotags associated with video segments stored in the geotagged video database, and a velocity of a video capture device during capture of the selected segment;

comparing content of the selected segment to content of each video segment in the set of segments using the encoding server to determine a similarity of content between the selected segment and each video segment in the set of relevant video segments by:

performing feature matching with respect to at least one frame in the selected video segment and at least one frame from a video segment within the set of relevant video segments; and comparing the photometric similarity of the at least one frame in the selected video segment and the at least one frame from the video segment within the set of relevant video segments;

determining a most relevant video segment from the set of relevant video segments that has content that is most similar to the content of the selected segment from the captured video sequence using the encoding server based upon the similarity of content in each video segment within the set of relevant video segments to content of the selected segment from the captured video sequence using the encoding server;

encoding the selected segment from the captured video sequence using the encoding server, where the selected segment is encoded using predictions that include references to the most relevant video segment from the geotagged video database, wherein the most relevant video segment from the geotagged video database was captured at a different time from the captured video sequence; and storing the encoded video segment in the geotagged video database using the encoding server.

2. The method of claim 1, wherein the geotags associated with the video segments stored in the geotagged video database are metadata including at least one piece of information selected from the group consisting of latitude and longitude coordinates, altitude, bearing, distance, velocity, tilt, accuracy data, time of day, date, and place name.

3. The method of claim 1, wherein the at least one geotag associated with the captured video sequence comprises latitude and longitude coordinates, altitude, bearing, and tilt.

4. The method of claim 1, wherein the at least one geotag associated with the captured video sequence comprises a plurality of geotags associated with individual frames in the captured video sequence.

5. The method of claim 1, wherein:

selecting a segment of the captured video sequence comprises selecting an intra-frame from the captured video sequence;

the set of relevant video segments from the geotagged video database comprises a set of frames selected from the group consisting of intra-frames and anchor frames from the video segments stored in the geotagged video database; and determining the most relevant video segment from the set of relevant video segments that is the best match comprises comparing the similarity of the selected intra-frame to the frames in the set of frames.

6. The method of claim 1, wherein identifying a set of relevant video segments from a geotagged video database using the encoding server based on the geographic capture location information associated with the selected video segment and the location information from geotags associated with video segments in the geotagged video database further comprises:

determining a capture location for the selected video segment based on geographic location information indicated by the at least one geotag associated with the captured video sequence; and searching the geotagged video database for video segments having geotags indicating a capture location in proximity to the capture location of the selected video segment.

7. The method of claim 6, wherein identifying a set of relevant video segments from a geotagged video database using the encoding server based on the geographic capture location information associated with the selected video segment and the location information from geotags associated with video segments in the geotagged video database further comprises:

determining view information for the selected video segment includes a capture altitude, a bearing and a tilt for the selected video segment based on information in the at least one geotag associated with the captured video sequence; and searching the geotagged video database for video segments having geotags indicating that the video segments having similar view information to the view information for the scene captured from the capture location at the capture altitude, bearing and tilt.

8. The method of claim 7, wherein identifying a set of relevant video segments from a geotagged video database using the encoding server based on the geographic capture location information associated with the selected video segment and the location information from geotags associated with video segments in the geotagged video database further comprises:

determining a capture time of the selected video segment based on information in the at least one geotag associated with the captured video sequence; and searching the geotagged video database for video segments having geotags indicating a capture time similar to the capture time of the selected video segment.

9. The method of claim 1, wherein:

the geotagged video database includes metadata indicating the video recording device that captured a video segment;

a plurality of video segments in the geotagged video database were captured using the same recording device used to capture the received video sequence; and wherein identifying a set of relevant video segments from a geotagged video database using the encoding server based on the geographic capture location information associated with the selected video segment and the location information from geotags associated with video segments in the geotagged video database further comprises searching for relevant video segments captured by the same recording device used to capture the received video sequence using the metadata in the geotagged video database indicating the video recording devices that captured video segments.

10. The method of claim 1, wherein determining the most relevant video segment from the set of relevant video segments considers both similarity of content measured during feature matching and photometric similarity.

11. The method of claim 1, wherein determining the most relevant video segment from the set of relevant video segments considers the number of video segments on which the encoding of a video segment depends.

12. The method of claim 1, wherein determining the most relevant video segment from the set of relevant video segments is based upon video segments in the set of video segments captured by the same recording device that captured the captured video sequence.

13. The method of claim 1, wherein:
the most relevant video segment from the geotagged video database is a different resolution from a resolution of the captured video sequence;
encoding the selected segment from the captured video sequence using the encoding server further comprises resampling the most relevant video segment from the geotagged video database to the resolution of the captured video sequence; and
encoding the selected segment using predictions that include references to the most relevant video segment from the geotagged video database comprises encoding the selected segment using predictions that include references to the resampled video segment.

14. The method of claim 13, further comprising generating metadata describing the resampling process used to resample the most relevant video segment from the geotagged video database and storing the metadata in a container file including the encoded segment from the captured video sequence.

15. The method of claim 1, wherein storing the encoded video segment in the geotagged video database further comprises storing the encoded video segment in a separate container file using the encoding server.

16. The method of claim 1, wherein storing the encoded video segment in the geotagged video database further comprises storing the encoded video segment in a container file that includes at least one video segment on which the encoding of the video segment depends.

17. The method of claim 16, wherein the encoded video sequence is multiplexed into the container file so that each particular reference frame referenced by a particular frame in the video sequence is located in the container file prior to the particular frame in the video sequence that references the particular reference frame.

18. The method of claim 1, wherein storing the encoded video segment in the geotagged video database comprises storing the encoded video segment on a server and writing an entry including the location of the encoded video segment into the geotagged video database.

19. The method of claim 1, wherein the captured video sequence comprises a plurality of video sequences wherein each of the plurality of video sequences is captured by a different one of a plurality of coordinated cameras where the plurality of coordinated cameras are coordinated to capture images at a same time, and wherein the video segments in the geotagged video database are captured by at least one camera that is not coordinated with the plurality of coordinated cameras.

20. The method of claim 1, wherein the captured video sequence and at least one video segment in the geotagged video database are captured using different cameras.

21. The method of claim 1, wherein the captured video sequence and at least one video segment in the geotagged video database are captured using the same camera.

22. A video sharing server system, comprising:
an encoding server; and
a geotagged video database including a plurality of video sequences tagged with geotags indicating geographic locations;
wherein the encoding server is configured to:
receive a captured video sequence including at least one video segment and associated with the captured video sequence at least one geotag, where the at least one geotag indicates geographic capture location information indicating at least one geographic location;
select a segment from the at least one video segment in the captured video sequence;
determine geographic capture location information associated with the selected segment from the at least one geotag associated with the captured video sequence;
identify a set of relevant video segments from a geotagged video database using the geographic capture location information associated with the selected video segment, location information from geotags associated with video segments stored in the geotagged video database, and a velocity of a video capture device during capture of the selected segment;
compare content of the selected segment to content of each video segment in the set of segments to determine a similarity of content between the selected segment and each video segment in the set of relevant video segments by:
performing feature matching with respect to at least one frame in the selected video segment and at least one frame from a video segment within the set of relevant video segments; and
comparing the photometric similarity of the at least one frame in the selected video segment and the at least one frame from the video segment within the set of relevant video segments;
determine a most relevant video segment from the set of relevant video segments that has content that is most similar to the content of the selected segment from the captured video sequence based on the similarity of content between the selected segment and each video segment in the set of relevant video segments;
encode the selected segment from the captured video sequence using predictions that include references to the most relevant video segment from the geotagged video database, wherein the most relevant video segment from the geotagged video database was captured at a different time from the captured video sequence; and
store the encoded video segment in the geotagged video database.

23. A non-transitory machine readable medium containing processor instructions, where execution of the instructions by a processor causes the processor to perform a process that comprises:
receiving a captured video sequence including at least one video segment and is associated with the captured video sequence at least one geotag, where the at least one geotag indicates geographic capture location information indicating at least one geographic location;
selecting a segment from the at least one video segment in the captured video sequence using the encoding server;

obtaining a set of relevant video segments from a geotagged video database using the geographic capture location information associated with the selected video segment, location information from geotags associated with video segments stored in the geotagged video database, and a velocity of a video capture device during capture of the selected segment;

comparing content of the selected segment to content of each video segment in the set of segments to determine a similarity of content between the selected segment and each video segment in the set of relevant video segments by:
- performing feature matching with respect to at least one frame in the selected video segment and at least one frame from a video segment within the set of relevant video segments; and
- comparing the photometric similarity of the at least one frame in the selected video segment and the at least one frame from the video segment within the set of relevant video segments;

determining a most relevant video segment from the set of relevant video segments that has content that is most similar to the content of the captured video sequence based on the similarity of content between the selected segment and each video segment in the set of relevant video segments; and encoding the selected segment from the captured video sequence using predictions that include references to the video segment from the geotagged video database that is the best match, wherein the most relevant video segment from the geotagged video database was captured at a different time from the captured video sequence.

* * * * *